(12) United States Patent
Komaba et al.

(10) Patent No.: US 9,497,343 B2
(45) Date of Patent: Nov. 15, 2016

(54) IMAGE FORMING APPARATUS, METHOD FOR DISPLAYING OPERATING SCREEN, AND STORAGE MEDIUM

(71) Applicant: KONICA MINOLTA, INC., Chiyoda-ku (JP)

(72) Inventors: Kenichi Komaba, Toyokawa (JP); Masao Hosono, Toyokawa (JP); Manabu Furukawa, Nagaokakyo (JP); Kenzo Yamamoto, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/568,334

(22) Filed: Dec. 12, 2014

(65) Prior Publication Data
US 2015/0172481 A1     Jun. 18, 2015

(30) Foreign Application Priority Data

Dec. 13, 2013    (JP) ................................ 2013-257603

(51) Int. Cl.
  *G06F 3/12* (2006.01)
  *H04N 1/00* (2006.01)
  *G06K 15/00* (2006.01)

(52) U.S. Cl.
  CPC ...... *H04N 1/00411* (2013.01); *H04N 1/00416* (2013.01); *H04N 1/00466* (2013.01); *H04N 1/00474* (2013.01); *H04N 1/00482* (2013.01); *H04N 1/00954* (2013.01); *H04N 2201/0094* (2013.01)

(58) Field of Classification Search
  None
  See application file for complete search history.

(56) References Cited

U.S. PATENT DOCUMENTS

2007/0176946 A1*  8/2007  Matoba ........................ 345/619

FOREIGN PATENT DOCUMENTS

| JP | 07-160149 A | 6/1995 |
| JP | 2000-235549 A | 8/2000 |
| JP | 2007-208440 A | 8/2007 |
| JP | 2009-122184 A | 6/2009 |

OTHER PUBLICATIONS

Japanese Official Communication dated Oct. 20, 2015 for corresponding Japanese patent application No. 2013-257603 and its partial English translation.

* cited by examiner

*Primary Examiner* — Dov Popovici
(74) *Attorney, Agent, or Firm* — Buchanan Ingersoll & Rooney PC

(57) ABSTRACT

An apparatus is provided with a display and a touch panel mounted on a display surface of the display. The apparatus includes a storage portion that stores, thereinto, data showing operation made on the touch panel in a normal mode; a determination portion that determines, in the normal mode, processing of displaying an operating screen on the display based on the operation made on the touch panel, and to determine, in the reproduction mode, the processing based on the data; and a control portion that performs, in the normal mode, the determined processing in a manner to end at a first timing, and, in a reproduction mode, if the determined processing corresponds to predetermined processing, the determined processing in a manner to end at a second timing which is later than the first timing.

15 Claims, 46 Drawing Sheets

FIG. 5

| | 5U | |
|---|---|---|
| P | | Q |
| TOUCH PANEL PLANE POSITION | DISPLAY PLANE POSITION | |
| (PX1,PY1) | (QX1,QY1) | |
| (PX2,PY2) | (QX2,QY2) | |
| (PX3,PY3) | (QX3,QY3) | |
| ⋮ | ⋮ | |

KEEP
(MOVE OR STATIONARY)

START COMMAND-RELATED SCREEN IDENTIFIER = G003

| TOUCH EVENT/PRESSED KEY | POSITION (QT) | ELAPSED TIME (SEC.) (Tr) |
|---|---|---|
| PRESS | (760,460) | 2.0 |
| KEEP | (760,460) | 0.1 |
| KEEP | (760,460) | 0.1 |
| ⋮ | ⋮ | ⋮ |
| RELEASE | (760,460) | 0.1 |
| HARD KEY "1" | – | 2.5 |
| ⋮ | ⋮ | ⋮ |
| HARD KEY "START" | – | 3.0 |

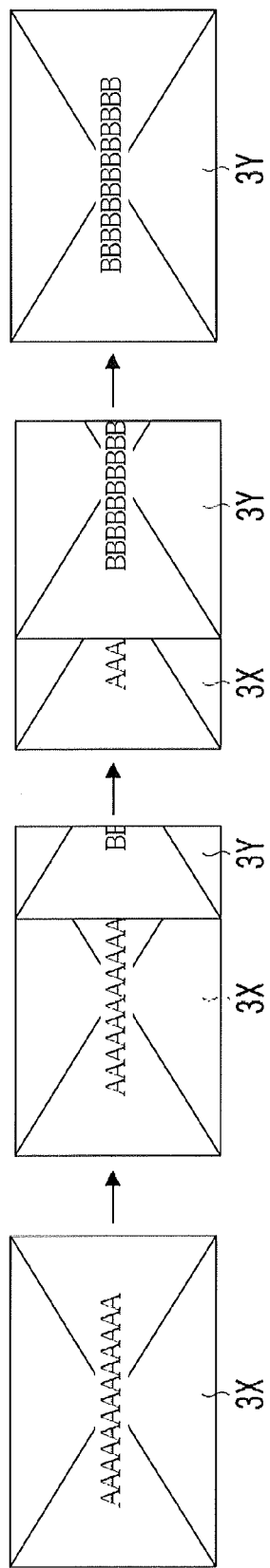

3HK2

IMAGE FORMING APPARATUS, METHOD FOR DISPLAYING OPERATING SCREEN, AND STORAGE MEDIUM

This application is based on Japanese patent application No. 2013-257603 filed on Dec. 13, 2013, the contents of which are hereby incorporated by reference.

BACKGROUND OF THE INVENTION

1. Field of the Invention

The present invention relates to a technology for displaying an image on a display unit in accordance with operation performed on a touch-sensitive panel.

2. Description of the Related Art

Recent years have seen the widespread use of image forming apparatuses having a variety of functions such as copying, scanning, faxing, PC printing, and box function (document server function). Such image forming apparatuses are sometimes called "multifunction devices" or "Multi-Functional Peripherals (MFPs)".

A variety of secondary functions to be used in combination with the foregoing functions has been developed in relation to improvement in hardware such as an Auto Document Feeder (ADF), a print engine, a Central Processing Unit (CPU), a Random Access Memory (RAM), and a large-capacity storage, and also in relation to improvement in environment for software development.

As described above, the functions of image forming apparatuses are expanded. The expansion of functions makes it possible for a user to cause such an image forming apparatus to execute various processing.

As the kind of processing executable by the image forming apparatus increases, operation on the image forming apparatus tends to be complicated. Likewise, as the kind of such processing increases, operation for settings to be performed by an administrator also tends to be complicated.

To address this, a method has been proposed in which a log of sample operation is recorded in advance and operation is reproduced based on the log for a user who wishes to know how to make operation (Japanese Laid-open Patent Publication Nos. 2000-235549 and 7-160149). According to the method, the user is allowed to check how to perform operation by seeing a transition of screens displayed on a display unit at a time when the operation is reproduced.

As the functions of image forming apparatuses are expanded, the variety of screens displayed on a display is increased. A user therefore sometimes cannot check how to perform operation even if he/she views a screen displayed by using a conventional reproduction method.

SUMMARY

The present invention has been achieved in light of such an issue, and an object thereof is to provide a technology which enables a user to check how to perform operation while he/she views a screen reproduced based on a log, more appropriately than is conventionally possible.

An image forming apparatus according to an aspect of the present invention is an image forming apparatus which is provided with a display and a touch panel mounted on a display surface of the display and has a normal mode of performing processing in response to operation made on the touch panel and a reproduction mode of performing processing based on a record of the operation made on the touch panel. The image forming apparatus includes a storage portion configured to store, thereinto, data showing operation made on the touch panel in the normal mode; a determination portion configured to determine, in the normal mode, display control processing of displaying at least one operating screen on the display based on the operation made on the touch panel, and to determine, in the reproduction mode, the display control processing based on the data; and a control portion configured to perform, in the normal mode, the determined display control processing in a manner to end at a first timing, and, in the reproduction mode, if the determined display control processing corresponds to predetermined processing, the determined display control processing in a manner to end at a second timing which is later than the first timing, and, if the determined display control processing does not correspond to the predetermined processing, the determined display control processing in a manner to end at the first timing.

An image forming apparatus according to another aspect of the present invention is an image forming apparatus which is provided with a display and a touch panel mounted on a display surface of the display and has a normal mode of performing processing in response to operation made on the touch panel and a reproduction mode of performing processing based on a record of the operation made on the touch panel. The image forming apparatus includes a storage portion configured to store, thereinto, data showing operation made on the touch panel in the normal mode; a determination portion configured to determine, in the normal mode, display control processing of displaying an operating screen on the display based on the operation made on the touch panel, and to determine, in the reproduction mode, the display control processing based on the data; and a control portion configured to, when an animation effect is selectively available in the determined display control processing; however when the animation effect is OFF, in the normal mode, perform the determined display control processing without using the animation effect, and in the reproduction mode, perform the determined display control processing by using the animation effect.

These and other characteristics and objects of the present invention will become more apparent by the following descriptions of preferred embodiments with reference to drawings.

BRIEF DESCRIPTION OF THE DRAWINGS

FIG. 5 is a diagram showing an example of positional correspondence data.

FIG. 11 is a diagram showing an example of operation log data.

FIGS. 20A and 20B are diagrams showing examples of a screen transition with an animation effect used.

DESCRIPTION OF THE PREFERRED EMBODIMENTS

Figure 1:
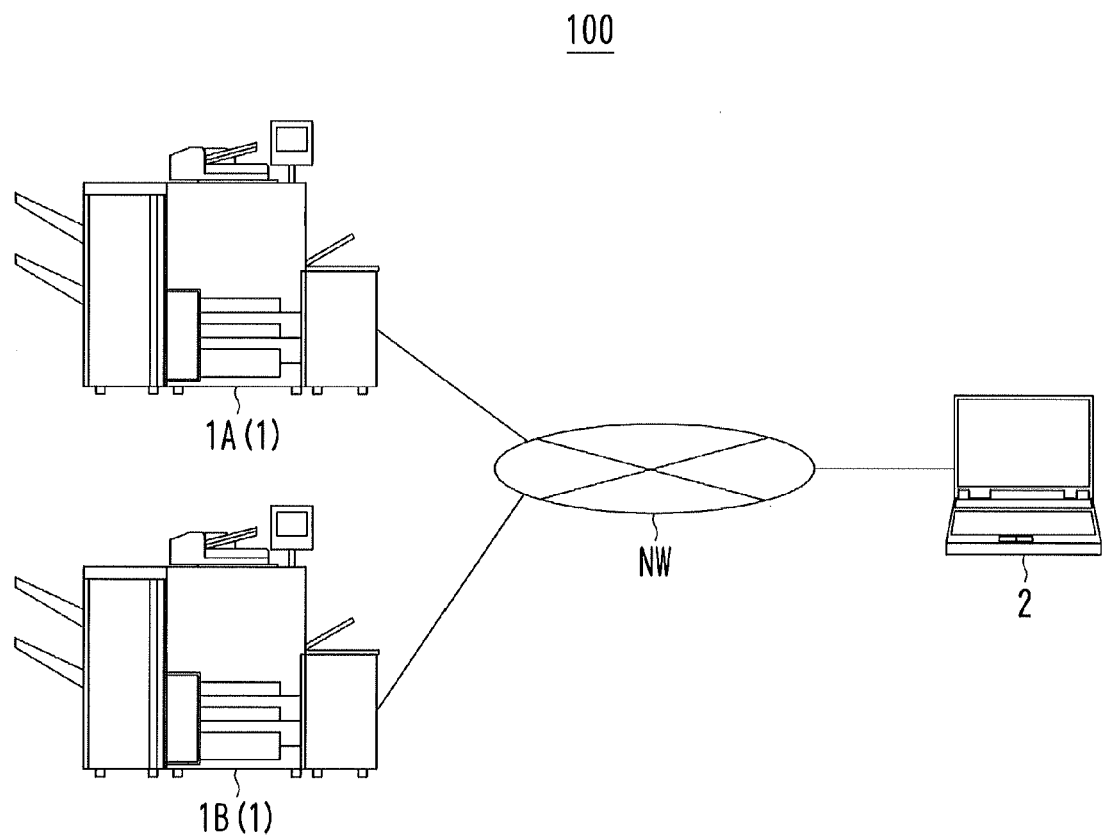
FIG. 1 is a diagram showing an example of a network system.
Figure 2:
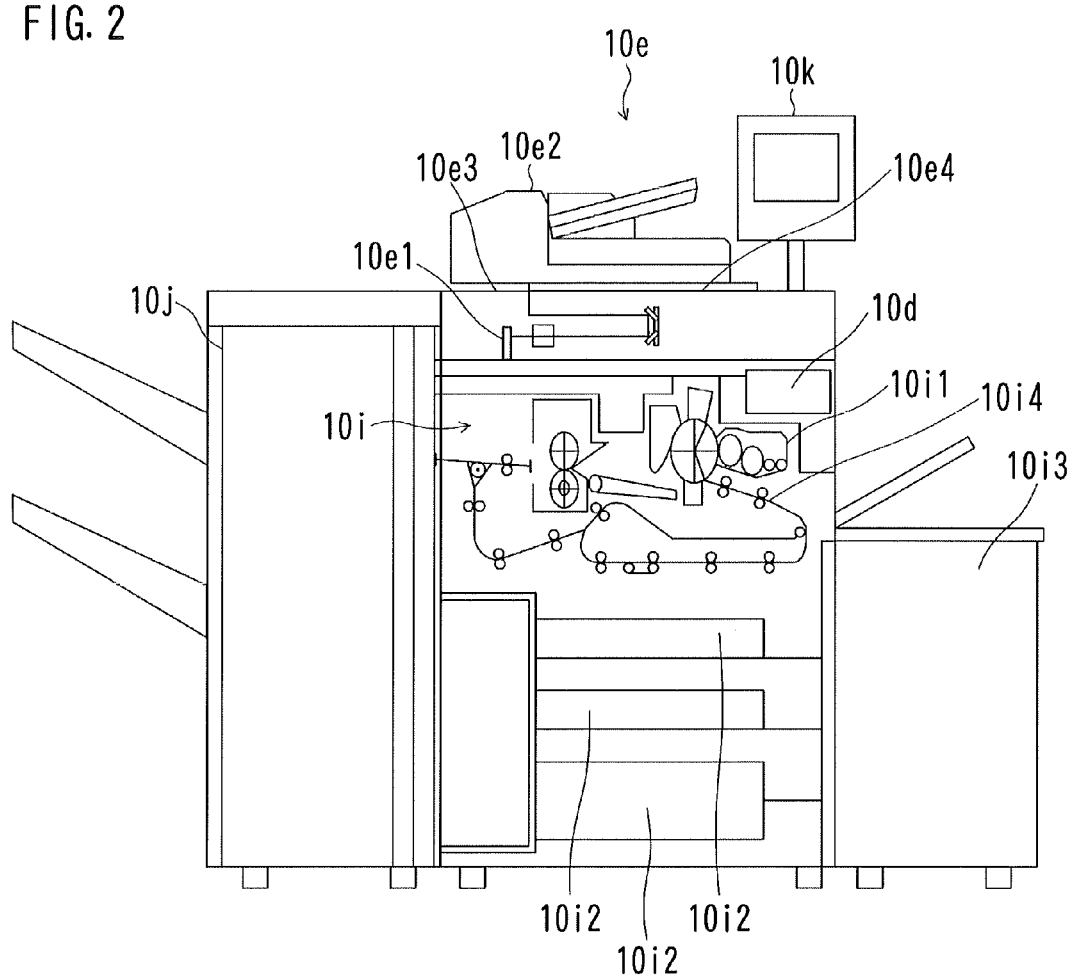
FIG. 2 is a diagram showing an example of an external view and an internal view of an image forming apparatus.
Figure 3:
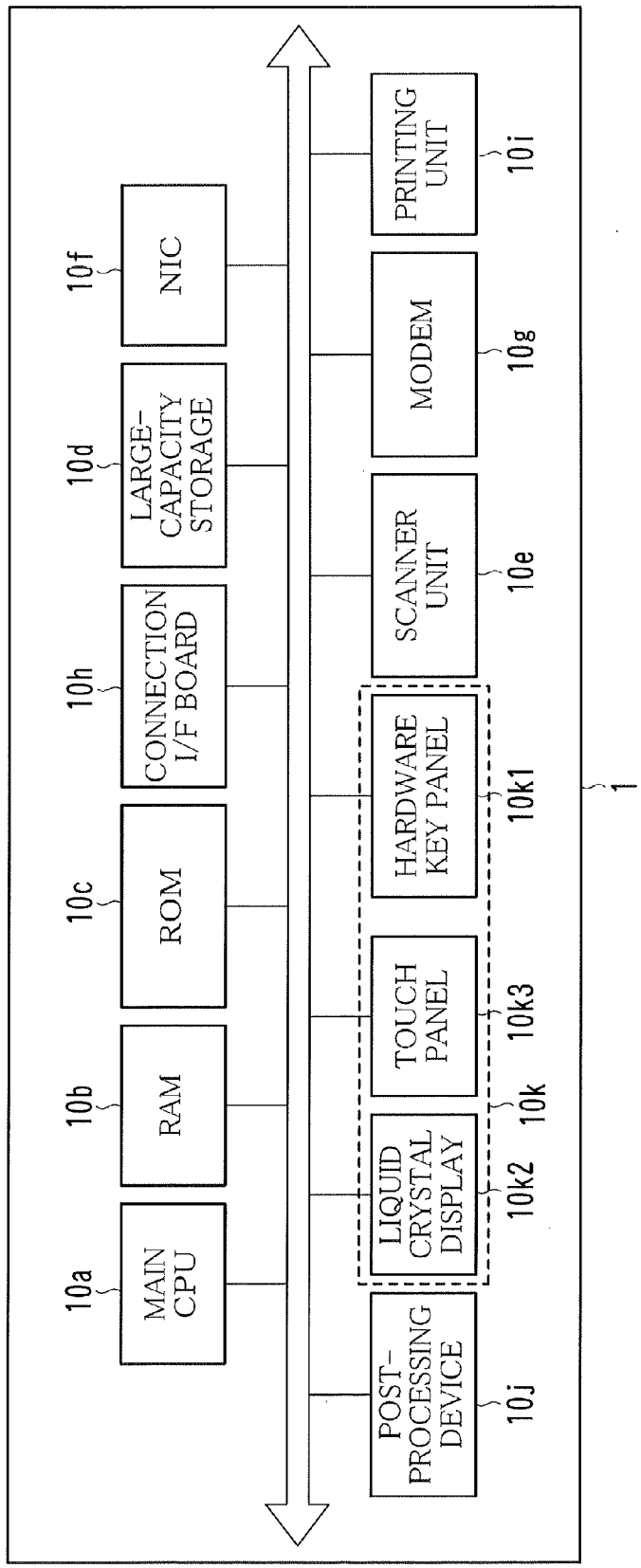
FIG. 3 is a diagram showing an example of the hardware configuration of an image forming apparatus.
Figure 4:
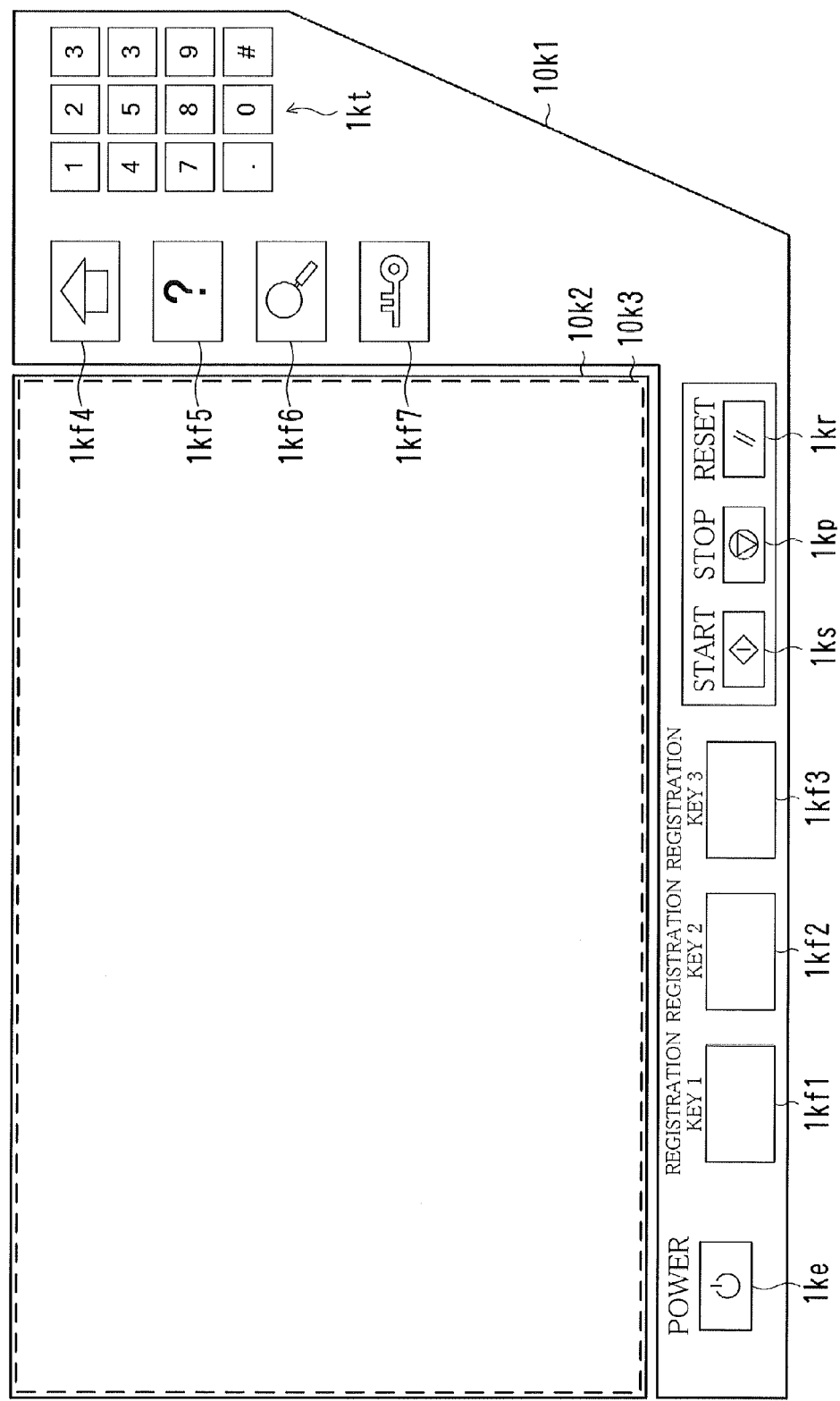
FIG. 4 is a diagram showing an example of the configuration of an operating panel unit.
Figure 6:
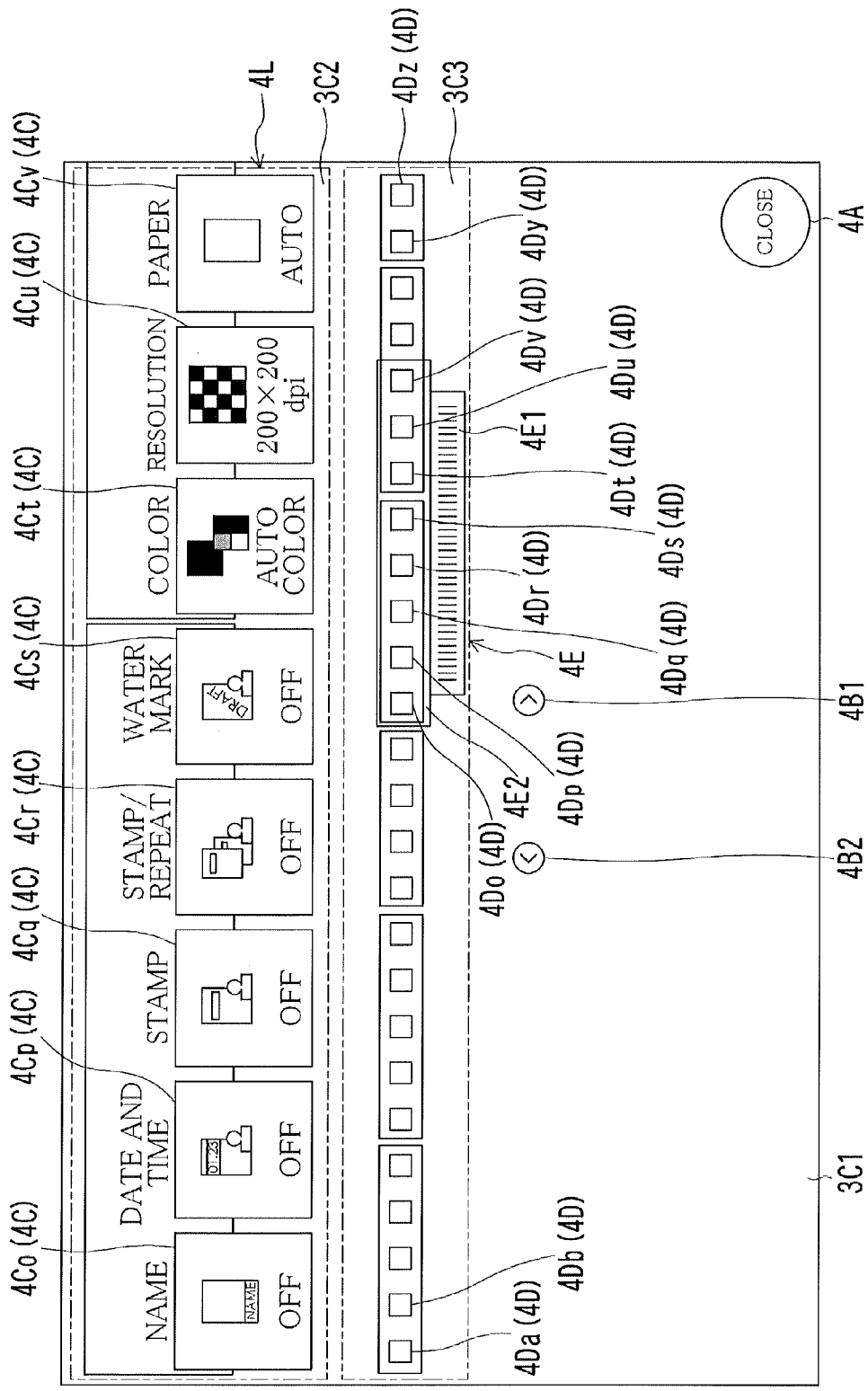
FIG. 6 is a diagram showing an example of a copy job screen.
Figure 7:
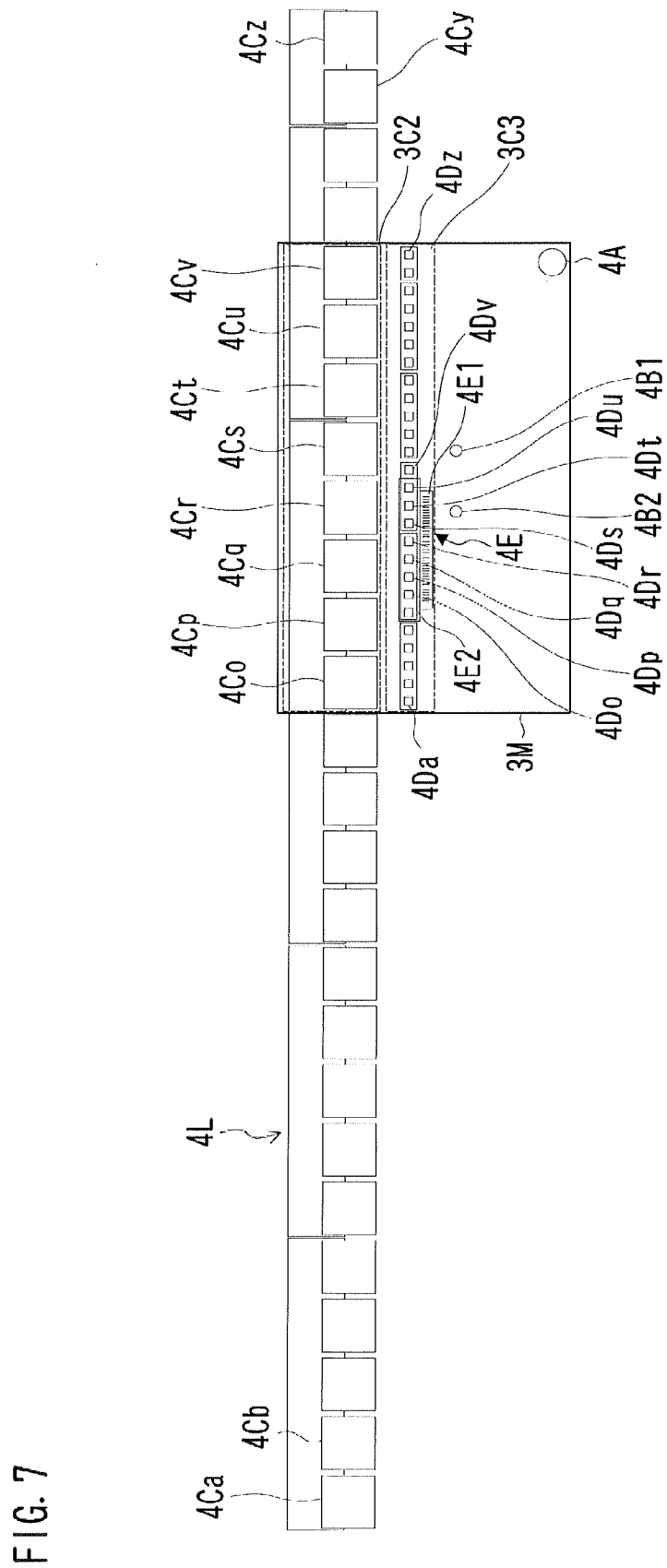
FIG. 7 is a schematic diagram for depicting the relationship between an icon row and a copy job screen.
Figure 8:
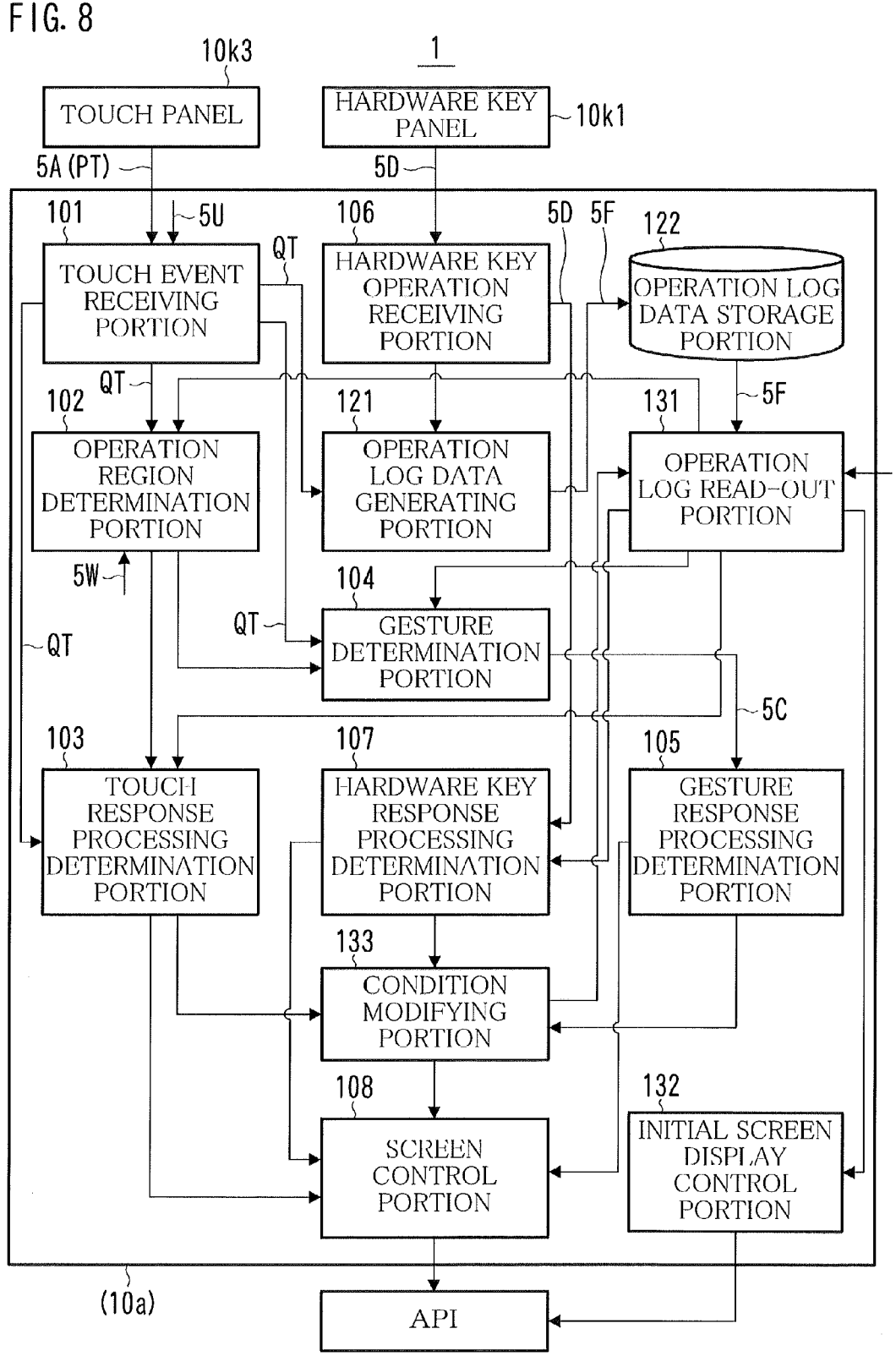
FIG. 8 is a diagram showing an example of the functional configuration of an image forming apparatus.

FIG. 1 is a diagram showing an example of a network system 100. FIG. 2 is a diagram showing an example of an external view and an internal view of an image forming apparatus 1. FIG. 3 is a diagram showing an example of the hardware configuration of the image forming apparatus 1. FIG. 4 is a diagram showing an example of the configuration of an operating panel unit 10k. FIG. 5 is a diagram showing an example of positional correspondence data 5U. FIG. 6 is a diagram showing an example of a copy job screen 3C. FIG. 7 is a schematic diagram for depicting the relationship between an icon row 4L and the copy job screen 3C. FIG. 8 is a diagram showing an example of the functional configuration of the image forming apparatus 1.

As shown in FIG. 1, the network system 100 is configured of a plurality of the image forming apparatuses 1, a terminal 2, a communication line NW, and so on. The image forming apparatuses 1 and the terminal 2 are configured to perform communication with one another via the communication line NW. Examples of the communication line NW are a public line, a dedicated line, the Internet, and a Local Area Network (LAN). Hereinafter, the image forming apparatuses 1 may be described separately as an "image forming apparatus 1A", an "image forming apparatus 1B", . . . , and so on.

The image forming apparatus 1 is an image processing apparatus that is generally called a "Multi-Functional Peripheral (MFP)" or a "multifunction device". The image forming apparatus 1 is an apparatus into which functions such as copying, PC printing (network printing), faxing, scanning, and box function are combined.

The box function is a function in which a storage area called a "box" or "personal box" is allocated to each user. The box function enables each user to save document data such as an image file to his/her storage area and to manage the document data therein. The box corresponds to a "folder" or "directory" in a personal computer.

Referring to FIG. 2 or FIG. 3, the image forming apparatus 1 is configured of a main Central Processing Unit (CPU) 10a, a Random Access Memory (RAM) 10b, a Read Only Memory (ROM) 10c, a large-capacity storage 10d, a scanner unit 10e, a Network Interface Card (NIC) 10f, a modem 10g, a connection interface board 10h, a printing unit 10i, a post-processing device 10j, an operating panel unit 10k, and so on.

The scanner unit 10e optically reads an image from a sheet of paper in which a photograph, character, picture, or chart is recorded, and generates image data thereof. To be specific, the scanner unit 10e is configured of an image sensor 10e1, an Auto Document Feeder (ADF) 10e2, a read slit 10e3, a platen glass 10e4, and so on.

The ADF 10e2 is operable to convey each sheet of paper placed thereon to the read slit 10e3. When the sheet of paper passes through the read slit 10e3, the image sensor 10e1 optically reads an image from the sheet of paper to generate image data of the image. In the case where a user places a document on the platen glass 10e4, the image sensor 10e1 scans the platen glass 10e4 to optically read an image from the document sheet, and generates image data of the image.

The NIC 10f performs communication with devices such as the terminal 2 in accordance with a protocol such as Transmission Control Protocol/Internet Protocol (TCP/IP).

The modem 10g performs communication with a fax terminal in accordance with a protocol such as a G3 through a fixed telephone network.

The connection interface board 10h is to connect peripheral devices to the image forming apparatus 1. Examples of the connection interface board 10h are a Universal Serial Bus (USB) board and an Institute of Electrical and Electronics Engineers (IEEE) 1394 board.

The printing unit 10i prints an image captured by the scanner unit 10e, or an image inputted through the NIC 10f, the modem 10g, or the connection interface board 10h. To be specific, the printing unit 10i is configured of an engine portion 10i1, a paper feed tray 1012, a large capacity paper feed portion 10i3, a sheet carrying mechanism 10i4, and so on.

One or more paper feed trays 1012 are provided in the printing unit 10i. Each of the paper feed trays 1012 houses therein paper (blank paper) having a predetermined size. The large capacity paper feed portion 10*i*3 also houses therein paper (blank paper) having a predetermined size. The large capacity paper feed portion 10*i*3 has a capacity larger than that of each of the paper feed trays 10*i*2. The large capacity paper feed portion 10*i*3 therefore stores therein paper of size most often used.

The sheet carrying mechanism 10*i*4 serves to convey each sheet of paper from the paper feed tray 10*i*2 or the large capacity paper feed portion 10*i*3 to the engine portion 10*i*1. The engine portion 10*i*1 serves to print an image onto the sheet of paper. The sheet carrying mechanism 10*i*4 outputs the sheet of paper which has been subjected to printing to a paper output tray or bin. If post-processing such as stapling or punching is to be performed, then the paper on which the image has been printed is conveyed to the post-processing device 10*j*.

The post-processing device 10*j* serves to apply the foregoing post-processing appropriately to the sheet or the sheets of paper on which the image has been printed.

The operating panel unit 10*k* is a user interface unit. As shown in FIG. 4, the operating panel unit 10*k* is configured of a hardware key panel 10*k*1, a liquid crystal display (LCD) 10*k*2, a touch panel 10*k*3, and so on.

The hardware key panel 10*k*1 is an input device which is configured of numeric keys 1*kt*, a start key 1*ks*, a stop key 1*kp*, a reset key 1*kr*, a power key 1*ke*, function keys 1*kf*1-1*kf*7, and so on. These keys are generally called "hardware keys" to be distinguished from keys displayed on the liquid crystal display 10*k*2 (so-called software keys). Among the function keys 1*kf*1-1*kf*7, the function key 1*kf*2 is assigned a command to start/finish recording operation (discussed later). The function key 1*kf*4 is assigned a command to display a home screen 3T (described later). The function key 1*kf*2 and the function key 1*kf*4 are therefore referred to as a "start/end command key 1*kf*2" and a "home key 1*kf*4", respectively.

The liquid crystal display 10*k*2 displays, for example, a screen for presenting messages to a user, a screen showing the results of processing, and a screen for allowing a user to input a command or conditions to the image forming apparatus 1.

The touch panel 10*k*3 is fixedly mounted so as to cover the entirety of the display surface of the liquid crystal display 10*k*2. The touch panel 10*k*3 is operable to detect a location touched (pressed) and to inform the main CPU 10*a* of the location. The touch panel 10*k*3 may be an electrostatic capacitance touch panel, a surface acoustic wave touch panel, or an electrostatic capacitance touch panel, for example.

Data (table, for example) as that shown in FIG. 5 is prepared in advance. The data indicates which position of the touch panel 10*k*3 is located on which position of the liquid crystal display 10*k*2. Stated differently, there is prepared data in advance which indicates the correspondence between each position on the touch panel 10*k*3 and each position on the liquid crystal display 10*k*2. Hereinafter, the data is referred to as "positional correspondence data 5U". A position on the touch panel 10*k*3 is hereinafter referred to as a "touch panel plane position P". A position on the liquid crystal display 10*k*2 is hereinafter referred to as a "display plane position Q".

When a touch is made on the touch panel 10*k*3, the main CPU 10*a* determines a display plane position Q corresponding to the touch panel plane position P of the touched position based on the positional correspondence data 5U, and may perform processing assuming that the display plane position Q was touched. Further, the main CPU 10*a* may perform processing assuming that the touch was made on a pixel of the display plane position Q on a screen currently displayed on the liquid crystal display 10*k*2 (such a screen is hereinafter referred to as a "current screen").

This configuration enables a user to operate the current screen by making a touch on the current screen through the touch panel 10*k*3.

A screen has different types of objects. For example, referring to FIG. 6, the copy job screen 3C has objects such as a close button 4A, a right scroll button 4B1, a left scroll button 4B2, a plurality of optional function icons 4C, a plurality of markers 4D, and a slider 4E.

The close button 4A is to close the copy job screen 3C to display again the immediately preceding screen on the liquid crystal display 10*k*2.

The optional function icons 4C represent optional functions. One optional function icon 4C corresponds to one optional function of the image forming apparatus 1. The optional function icons 4C are arranged in a single horizontal row to form an icon row 4L. However, all the optional function icons 4C cannot be displayed at one time. To be specific, as shown in FIG. 7, only some of the optional function icons 4C appear on the copy job screen 3C, and the other optional function icons 4C do not appear thereon.

The user scrolls across the icon row 4L to display the other optional function icons 4C sequentially. Hereinafter, the optional function icons 4C are sometimes differentiated by denoting an "optional function icon 4Ca", an "optional function icon 4Cb", and an "optional function icon 4Cz" in order from left to right.

The right scroll button 4B1 is to scroll across the icon row 4L from right to left. The left scroll button 4B2 is to scroll across the icon row 4L from left to right.

As with the optional function icons 4C, the markers 4D are arranged in a single horizontal row. The number of markers 4D is the same as the number of optional function icons 4C. The markers 4D, sequentially from left to right, correspond to an optional function icon 4Ca, an optional function icon 4Cb, . . . , and an optional function icon 4Cz. All the markers 4D appear on the copy job screen 3C at one time. Hereinafter, the markers 4D corresponding to the optional function icon 4Ca, the optional function icon 4Cb, . . . , and the optional function icon 4Cz are sometimes referred to as a "marker 4Da", a "marker 4Db", . . . , and a "marker 4Dz", respectively.

The slider 4E includes a slider bar 4E1 and a window 4E2. The slider bar 4E1 moves to left or right in response to drag or flick.

The window 4E2 is provided right above the slider bar 4E1. The markers 4D corresponding to the optional function icons 4C currently appearing on the copy job screen 3C are enclosed by the window 4E2.

The window 4E2 is provided to attach to the slider bar 4E1. The window 4E2 therefore moves together with the movement of the slider bar 4E1. The user operates the slider bar 4E1 to change the markers 4D enclosed by the window 4E2. Along with the change of the markers 4D enclosed by the window 4E2, the icon row 4L is scrolled through, so that the optional function icons 4C appearing on the copy job screen 3C are changed.

The user also drags or flicks the icon row 4L directly to scroll through the same.

When the icon row 4L is scrolled through in response to operation on the right scroll button 4B1 or the left scroll button 4B2, the slider 4E moves depending on as to how the optional function icons 4C appear on the copy job screen 3C.

In the meantime, the liquid crystal display 10k2 displays a screen having only one region in some cases, and displays a screen having a plurality of sectioned regions in other cases. Hereinafter, a constituent region of the screen is referred to as an "element region". The element region is classified into two types of a simple operation region and a gesture region.

The "simple operation region" is a region in which, as user action (operation), only tap is received. In contrast, the "gesture region" is a region in which, as the user action, tap, flick, drag, double-tap, and so on are received.

It is determined in advance which element region each pixel of each screen is located in, and which of the simple operation region and the gesture region each element region corresponds to. Such determination is defined in data for display (such data is hereinafter referred to as "screen data 5W") on each screen.

Referring to FIG. 6, the copy job screen 3C is divided into a first element region 3C1, a second element region 3C2, and a third element region 3C3. The first element region 3C1 is set as the simple operation region, and each of the second element region 3C2 and the third element region 3C3 is set as the gesture region.

Referring back to FIGS. 2 and 3, the ROM 10c or the large-capacity storage 10d stores, therein, programs for implementing the functions such as copying and PC printing. As shown in FIG. 8, the ROM 10c or the large-capacity storage 10d also stores, therein, programs for implementing the functions of a touch event receiving portion 101, an operation region determination portion 102, a touch response processing determination portion 103, a gesture determination portion 104, a gesture response processing determination portion 105, a hardware key operation receiving portion 106, a hardware key response processing determination portion 107, a screen control portion 108, an operation log data generating portion 121, an operation log data storage portion 122, an operation log read-out portion 131, an initial screen display control portion 132, a condition modifying portion 133, and so on.

The programs are loaded into the RAM 10b as necessary, and are executed by the main CPU 10a.

The touch event receiving portion 101 through the condition modifying portion 133 shown in FIG. 8 control the individual pieces of hardware, based on operation performed by the user on the operating panel unit 10k, in such a manner that a screen is displayed or a job is executed. The touch event receiving portion 101 through the condition modifying portion 133 also record an operation log to reproduce operation later based on the recorded operation log.

Hereinafter, the processing by the touch event receiving portion 101 through the screen control portion 108 shall be described, the descriptions being broadly divided into basic processing based on operation, processing for making a record of operation, and processing for reproducing operation based on the record. A mode in which processing is performed depending on real-time operation by the user is hereinafter referred to as "normal mode". A mode in which processing is performed by reproducing operation based on a record is hereinafter referred to as "reproduction mode".

[Basic Processing Based on Operation]

Figure 9A:
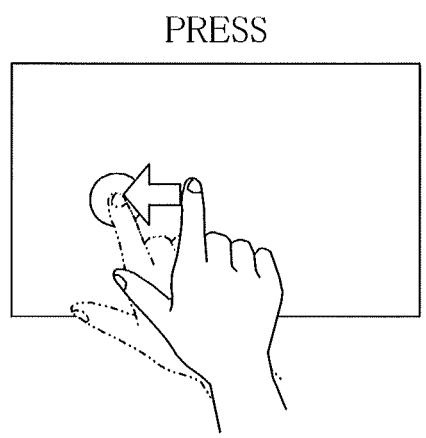
FIGS. 9A-9C are diagrams showing examples of a basic touch action.
Figure 9B:
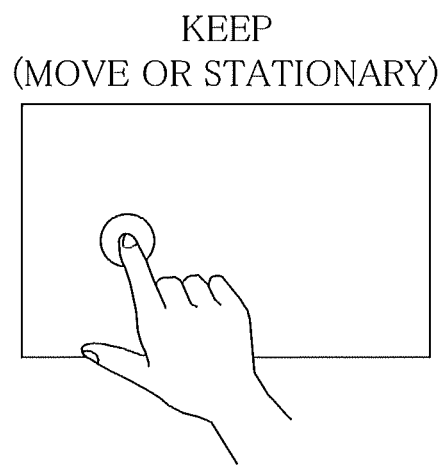
Figure 9C:
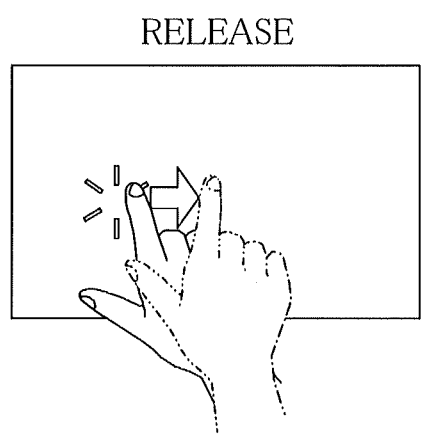
Figure 10A:
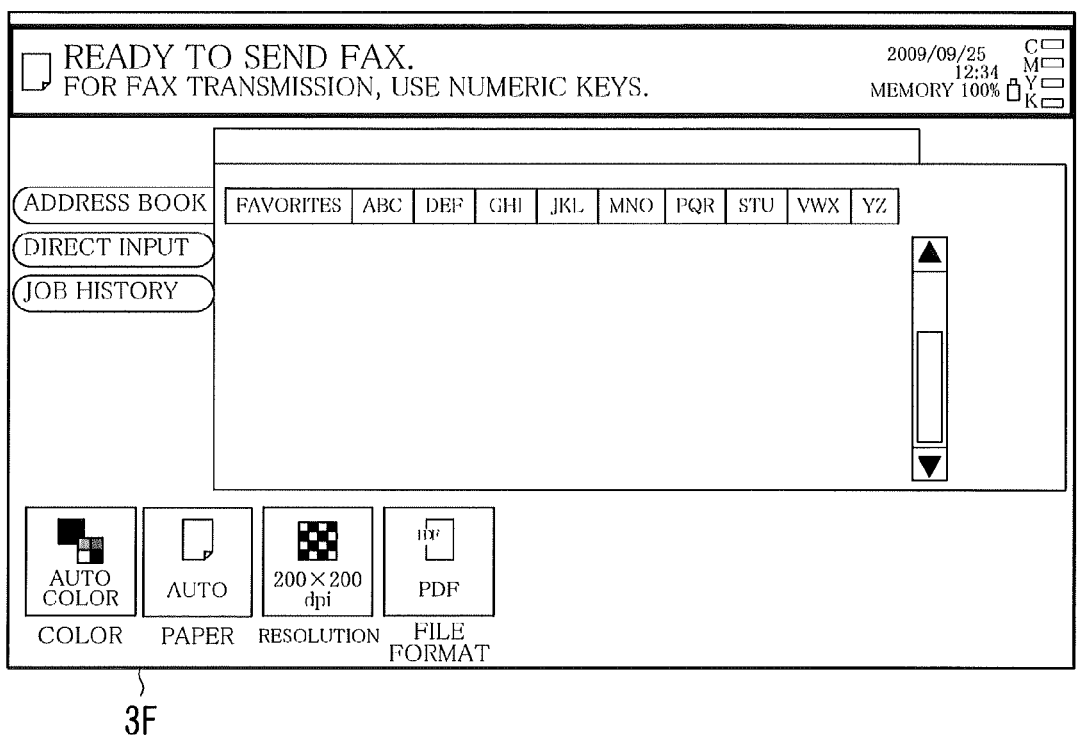
FIGS. 10A and 10B are diagrams showing examples of a fax transmission job screen.
Figure 10B:
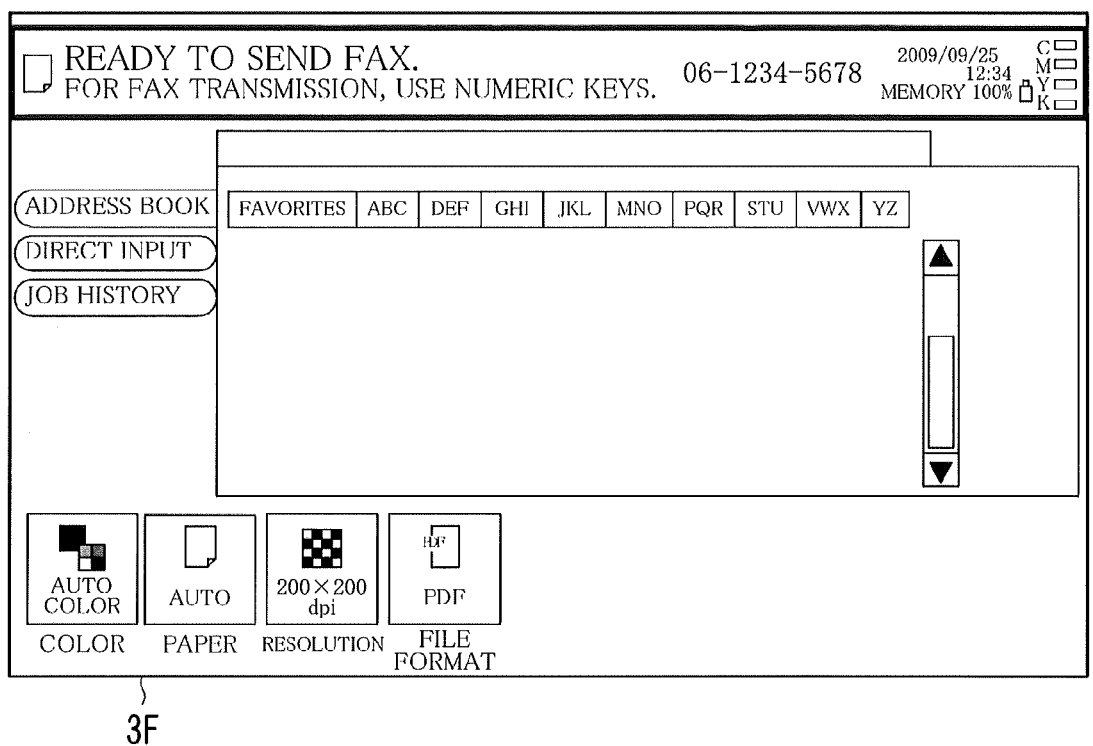

FIGS. 9A-9C are diagrams showing examples of a basic touch action. FIGS. 10A and 10B are diagrams showing examples of a fax transmission job screen 3F.

The touch event receiving portion 101 through the screen control portion 108 shown in FIG. 8 performs, in the normal mode, processing as discussed below in accordance with operation performed in real time, by the user, on the hardware key panel 10k1 or the touch panel 10k3.

When detecting a touch by a finger or pen, the touch panel 10k3 outputs a touched position signal 5A indicating a touch panel plane position P touched (hereinafter referred to as a "touched position PT") on the touch panel for every predetermined time Ta until the touch is finished, namely, until the finger or pen ceases contact with the touch panel 10k3.

Every time receiving a touched position signal 5A, the touch event receiving portion 101 calculates, based on the positional correspondence data 5U (see FIG. 5), a display plane position Q (hereinafter, referred to as a "touched position QT") corresponding to the touched position PT indicated in the touched position signal 5A.

Further, every time the touch event receiving portion 101 receives a touched position signal 5A, and when detection of a touched position signal 5A stops, the touch event receiving portion 101 detects an event made on the touch panel 10k3 (such an event being referred to as a "touch event") in the following manner.

If the touch event receiving portion 101 received no touch panel coordinates P the predetermined time Ta before the current time, and receives touch panel coordinates P this time, then the touch event receiving portion 101 detects, as the touch event, a "press" as shown in FIG. 9A.

After the detection of the press, if the touch event receiving portion 101 detects touch panel coordinates P for every predetermined time Ta, then the touch event receiving portion 101 detects, as the touch event, a "keep" as shown in FIG. 9B. In general, the keep can be classified into a "move" in which the touch location changes and a "stationary" in which the touch location does not change. The "move" and the "stationary" may be detected distinctively from each other. However, in this embodiment, the "keep" is detected without any distinction between the "move" and the "stationary".

If the touch event receiving portion 101 does not receive any touched position signal 5A for a time longer than the predetermined time Ta, namely, if detection of a touched position signal 5A stops, then the touch event receiving portion 101 detects, as the touch event, a "release" as shown in FIG. 9C.

When the touch event receiving portion 101 receives a touched position signal 5A for a press (i.e., a first touched position signal 5A), the operation region determination portion 102 determines, based on the screen data 5W on the current screen, which type of region the touched position QT calculated based on the touched position signal 5A is located in. To be specific, the operation region determination portion 102 determines an element region in which a pixel of the touched position QT on the current screen is located. The operation region determination portion 102 then determines the type of a region (simple operation region or gesture region) set as the element region.

The touch response processing determination portion 103, the gesture determination portion 104, and the gesture response processing determination portion 105 perform the processing described below in accordance with the result of determination by the operation region determination portion 102.

When the element region where the pixel of the touched position QT is located is determined to be a simple operation region, the touch response processing determination portion 103 determines processing to be executed in response to the touch event by the user. Hereinafter, the processing is referred to as "touch response processing". The determination method is the same as conventional determination methods. An example of the determination method is discussed below.

As described earlier, the touch event receiving portion 101 detects, as the touch event, any one of the press, keep, and release. The touch response processing determination portion 103 determines processing in accordance with the pixel of the touched position QT and the touch event detected.

For example, if an object including the pixel of the touched position QT is the close button 4A of the copy job screen 3C shown in FIG. 6, and if the touch event is a press, then the touch response processing determination portion 103 determines that the touch response processing is processing of changing the style of the close button 4A (e.g., changing the color thereof to gray, or, changing the shape thereof to a concave shape). After that, if the touch event of release is made in any position of the close button 4A, then the touch response processing determination portion 103 determines that the touch response processing is processing correlated, in advance, with the close button 4A, i.e., processing of closing the copy job screen 3C to display the immediately preceding screen.

Alternatively, if an object including the pixel of the touched position QT is the right scroll button 4B1, and if the touch event is determined to be a press or keep, then the touch response processing determination portion 103 determines that the touch response processing is processing of scrolling across the icon row 4L from right to left.

On the other hand, when the element region where the pixel of the touched position QT is located is determined to be a gesture region, the gesture determination portion 104 and the gesture response processing determination portion 105 perform the following processing.

Based on the touch events successively detected by the touch event receiving portion 101 and on the touched position QT for each of the touch events, the gesture determination portion 104 determines a gesture represented by the series of the touch events. The determination method is the same as conventional determination methods. An example of the determination method is discussed below.

For example, if combined operation of a press, keep, and release is detected twice on the identical touched position QT within a predetermined time Tb (0.5 sec. for example), then the gesture determination portion 104 determines that the gesture is a double-tap. Alternatively, if combined operation of a press, keep, and release is detected once on the identical touched position QT, and if no touch event is detected on the identical touched position QT within the predetermined time Tb, then the gesture determination portion 104 determines that the gesture is a tap.

Quick operation sometimes does not allow a keep to be detected properly. In light of this, even if combined operation of a press and release is detected instead of the combined operation of a press, keep, and release, the determination is made in the same manner as that described above. If the number of consecutive "keep" is greater than a predetermined number of times, then the gesture determination portion 104 may determine that such a gesture is not a tap but a long tap. If the distance between two touched positions QT falls within a predetermined range, then the gesture determination portion 104 may regard the two touched positions QT as the identical touched position QT.

Alternatively, after the detection of a press, if a keep is detected while a touched position QT move unidirectionally at a speed greater than a predetermined speed Sa, and if a release is detected, then the gesture determination portion 104 determines that such a gesture is a flick. At this time, as a condition value 5C, the speed and direction at/in which the touched position QT move are also calculated.

Yet alternatively, after the detection of a press, if a keep is detected while a touched position QT moves at a speed smaller than the predetermined speed Sa, then the gesture determination portion 104 determines that such a gesture is a drag. At this time, as the condition value 5C, a locus of the touched position QT (coordinates for each time) are also obtained. If operation not related to "drag" is performed before a release, it is possible to regard the drag as having been cancelled. For example, if a touch is made at a position away from the locus of the touched position QT before the release, it is possible to regard the drag as having been cancelled.

The gesture response processing determination portion 105 determines processing to be executed in response to the gesture made by the user. Hereinafter, the processing is referred to as "gesture response processing". The determination method is the same as conventional determination methods. An example of the determination method is discussed below.

For example, if the user flicks any of the optional function icons 4C of the copy job screen 3C of FIG. 6, then the gesture response processing determination portion 105 determines that the gesture response processing is processing of scrolling across the icon row 4L in accordance with the condition value 5C (indicating the speed and direction at/in which the touched position QT move).

If the user double-taps an optional function icon 4Cs, then the gesture response processing determination portion 105 determines that the gesture response processing is processing of changing the style of the optional function icon 4Cs so as to indicate "ON", and of updating the set value of watermark application to be ON.

Every time a key (hardware key) is pressed, the hardware key panel 10k1 outputs a pressed key signal 5D indicating the pressed key to the main CPU 10a. In response to the output, the hardware key operation receiving portion 106 and the hardware key response processing determination portion 107 perform the following processing.

The hardware key operation receiving portion 106 receives the pressed key signal 5D. The hardware key response processing determination portion 107 determines, based on the current screen and the pressed key signal 5D, processing to be executed in response to the operation performed by the user on the hardware key panel 10k1. Hereinafter, the processing is referred to as "hardware key response processing". The determination method is the same as conventional determination methods. An example of the determination method is discussed below.

For example, if the user presses the function key 1kf1 (see FIG. 4) while any screen is displayed, then the hardware key response processing determination portion 107 determines that the hardware key response processing is processing of displaying the fax transmission job screen 3F as that shown in FIG. 10A.

Alternatively, if the user enters facsimile number with the numeric keys 1kt while the fax transmission job screen 3F is displayed as the current screen, then the hardware key response processing determination portion 107 determines that the hardware key response processing is processing of receiving the facsimile number as a transmission destination and reflecting the facsimile number in the fax transmission job screen 3F as shown in FIG. 10B.

Every time the touch response processing determination portion 103 determines the touch response processing, every time the gesture response processing determination portion 105 determines the gesture response processing, or every time the hardware key response processing determination portion 107 determines the hardware key response processing, the screen control portion 108 controls the individual pieces of hardware in such a manner that the determined touch response processing, gesture response processing, or hardware key response processing is executed, respectively. Hereinafter, the touch response processing, the gesture response processing, and the hardware key response processing are collectively called "response processing".

The response processing can be performed via an Application Program Interface (API) as with conventional methods. In the reproduction mode discussed later, the condition modifying portion 133 sometimes changes conditions related to screen display. In such a case, the screen control portion 108 controls each piece of the hardware based on the post-change conditions.

The screen control portion 108 further controls the liquid crystal display 10*k*2 in such a manner that a message window is displayed depending on the notification from the operating system.

[Processing for Making Record of Operation]

FIG. 11 is a diagram showing an example of operation log data 5F.

When the user enters a command to start making a record of operation (hereinafter, referred to as a "start command"), the operation log data generating portion 121 and the operation log data storage portion 122 of FIG. 8 perform processing for making a record of a log of operation performed on the operating panel unit 10*k* in the following manner.

The user displays, on the liquid crystal display 10*k*2, a screen for performing the initial operation of a series of operation to be reproduced later. The user then enters the start command to start the series of operation.

As with the normal mode, the touch event receiving portion 101 through the screen control portion 108 perform the processing according to the series of operation in the foregoing manner. In particular, every time the touch event receiving portion 101 receives a touched position signal 5A from the touch panel 10*k*3, the touch event receiving portion 101 calculates the touched position QT. Further, every time the touch event receiving portion 101 receives a touched position signal 5A, and when detection of the touched position signal 5A stops, the touch event receiving portion 101 determines a touch event. The hardware key operation receiving portion 106 receives the pressed key signal 5D from the hardware key panel 10*k*1.

The operation log data generating portion 121 generates the operation log data 5F as shown in FIG. 11 to store the same into the operation log data storage portion 122.

The operation log data 5F indicates touch events and touched positions QT detected by the touch event receiving portion 101 and the pressed key signals 5D received by the hardware key operation receiving portion 106 during a period between the entry of the start command and the entry of a command to finish making a record of operation (hereinafter, referred to as an "end command"). Further, the operation log data 5F also indicates elapsed time Tr from when the previous (immediately preceding) touch event or pressed key signal 5D was detected or received to when each touch event and each pressed key signal 5D is detected or received. As the elapsed time Tr for the foremost touch event or pressed key signal 5D, the elapsed time since the start command has been entered is indicated.

As the end command is entered, the operation log data generating portion 121 finishes the processing for generating the operation log data 5F. The operation log data 5F is given an identifier of a screen that was displayed on the liquid crystal display 10*k*2 at the time when the start command was entered. Such an identifier is hereinafter referred to as a "start command-related screen identifier".

[Processing for Reproducing Operation]

In response to entry by the user a command to reproduce operation (hereinafter, referred to as a "reproduction command"), the operation log read-out portion 131 and the condition modifying portion 133 of FIG. 8 work in coordination with the operation region determination portion 102 through the screen control portion 108 to perform processing, as described below, for reproducing a series of operation that was performed by the user.

In response to entry of the reproduction command, the operation log read-out portion 131 switches the mode of the image forming apparatus 1 from the normal mode to the reproduction mode, and reads out the operation log data 5F from the operation log data storage portion 122.

Then, the operation log read-out portion 131 conveys the start command-related screen identifier given to the operation log data 5F to the initial screen display control portion 132.

In response to this operation, the initial screen display control portion 132 controls a liquid crystal display 10*k*2 so as to display a screen corresponding to the start command-related screen identifier.

The operation log read-out portion 131 gives records of the operation log data 5F, in descending order, to any one of the operation region determination portion 102, the touch response processing determination portion 103, the gesture determination portion 104, and the hardware key response processing determination portion 107.

To be specific, a record indicating a touch event is handled in a manner similar to that of the result of processing by the touch event receiving portion 101. To be more specific, if a record indicates a press as the touch event, then the record is given to the operation region determination portion 102. The operation region determination portion 102 then determines a type of the region where a touched position QT indicated in the record is located (simple operation region or gesture region). The determination method is the same as that in the normal mode, and is described earlier.

When the type of the region is determined to be a simple operation region, the record indicating the touch event, the immediate record, and subsequent records up to the next "release" are conveyed to the touch response processing determination portion 103. In that case, the touch response processing determination portion 103 determines a touch response processing. On the other hand, when the type of the region is determined to be a gesture region, the record indicating the touch event, the immediate record, and subsequent records up to the next "release" are conveyed to the gesture determination portion 104. In that case, the gesture determination portion 104 determines a gesture, and the gesture response processing determination portion 105 determines a gesture response processing.

In contrast, a record indicating a pressed key signal 5D is handled in a manner similar to that of the result of processing by the hardware key operation receiving portion 106. In short, the record is conveyed to the hardware key response processing determination portion 107. In that case, the hardware key response processing determination portion 107 determines a hardware key response processing.

The method for determining touch response processing, method for determining gesture, method for determining gesture response processing, and method for determining hardware key response processing are the same as those in the case of the normal mode, which are described earlier.

The records are conveyed to the portions, in principle, at a time in accordance with the elapsed time Tr indicated in each of the records. To be specific, the foremost record is conveyed at a time when the elapsed time Tr indicated in the foremost record has passed since a reproduction command was entered. The N-th (N≥2) record is conveyed at a time when the elapsed time Tr indicated in the N-th record has passed since the (N−1)-th record was conveyed. As described later, however, a time at which a record is conveyed is sometimes delayed if the speed or style of screen display is changed.

The condition modifying portion 133 modifies display conditions if necessary when the response processing is determined to be processing related to screen display. The condition modifying portion 133 also modifies conditions if necessary when the processing related to screen display is performed in accordance with information from the operating system. The description goes on to an example in which a screen is displayed with conditions changed.

[Case where Part of Screen Transitions]

Figure 12A:
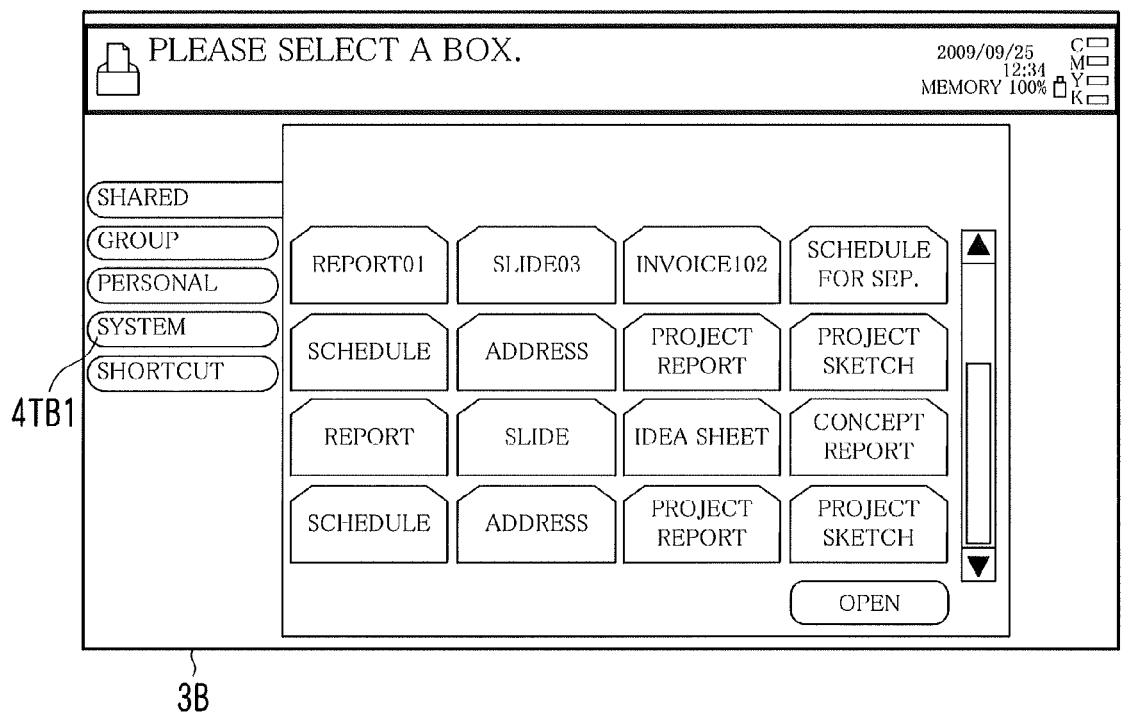
FIGS. 12A and 12B are diagrams showing examples of a box screen.
Figure 12B:
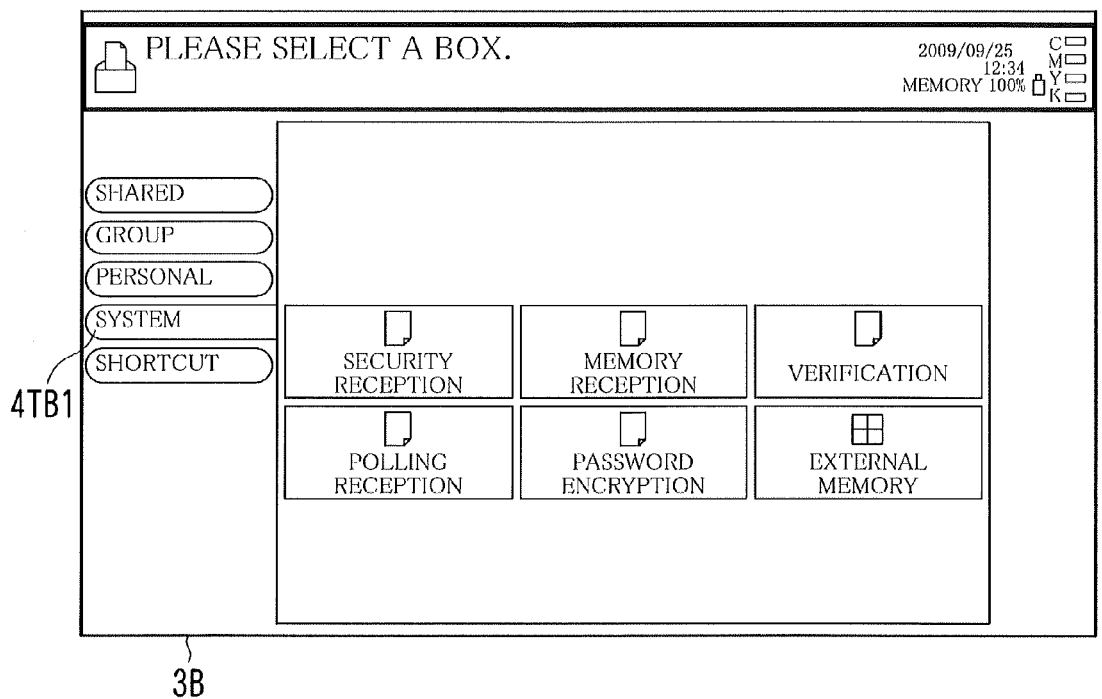

FIGS. 12A and 12B are diagrams showing examples of a box screen 3B.

In some cases, a part of the current screen is transitioned in response to specific operation on a specific object. The transition speed is set to be smaller in the reproduction mode than in the normal mode.

For example, when the tab 4TB1 is tapped, the box screen 3B of FIG. 12A is partially transitioned to that as shown in FIG. 12B.

If the response processing is determined to be processing of transitioning the box screen 3B to that as shown in FIG. 12B, then the condition modifying portion 133 changes a condition for start timing of this processing from the current condition to a condition that the start timing is delayed by time Ts1 (2.0 seconds, for example).

The screen control portion 108 performs the response processing based on the post-change condition. Thereby, the box screen 3B changes time Ts1 late, as compared with the case of the normal mode.

The operation log read-out portion 131 delays conveying the next record, by time Ts1, to any one of the operation region determination portion 102, the touch response processing determination portion 103, the gesture determination portion 104, and the hardware key response processing determination portion 107. This causes a delay, by time Ts1 as a whole, in the series of operation after the screen transition of the box screen 3B from the state of FIG. 12A to the state of FIG. 12B.

[Case where Dialog Box or Pull-Down Menu is Displayed Above the Current Screen]

Figure 13:
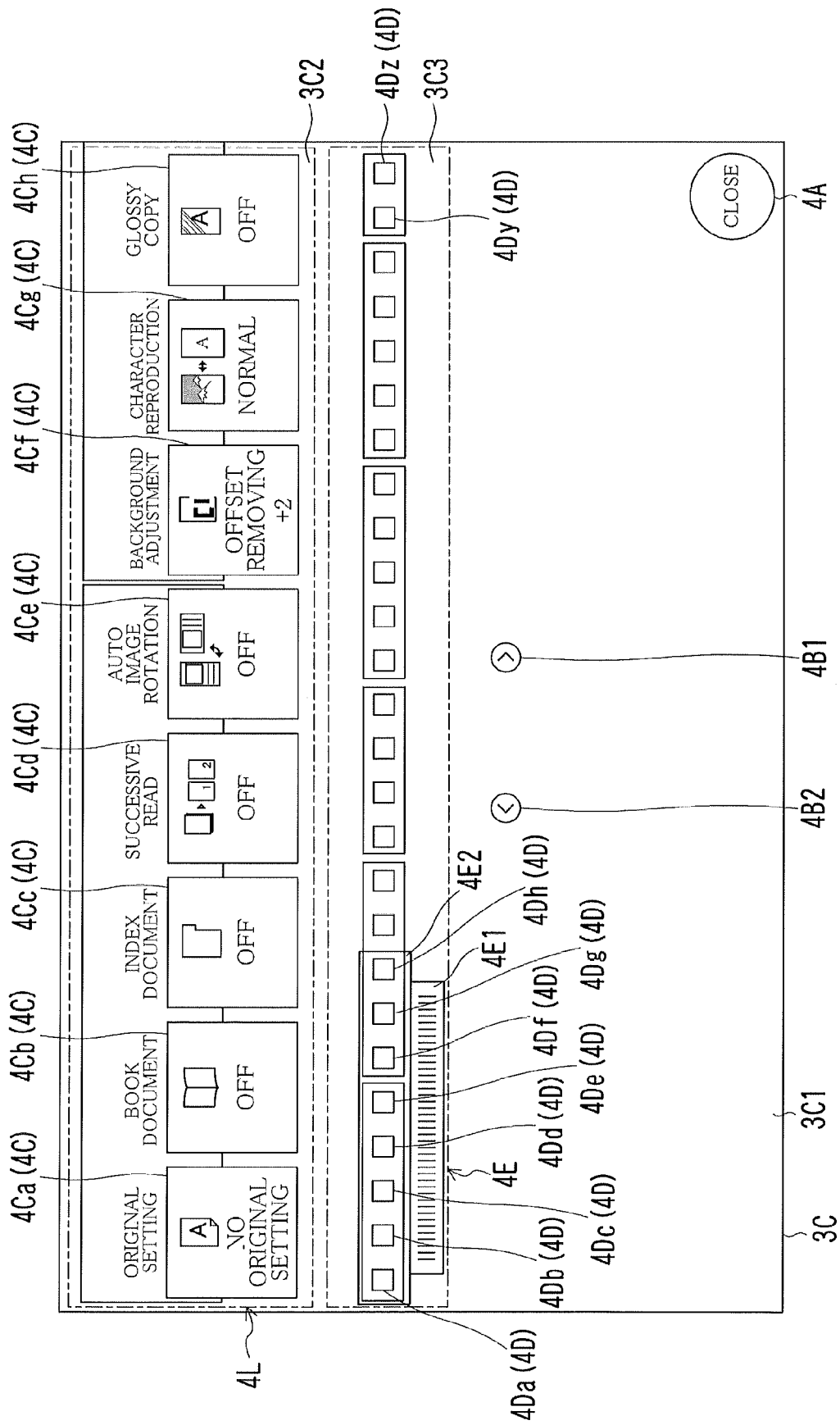
FIG. 13 is a diagram showing an example of a copy job screen.
Figure 14A:
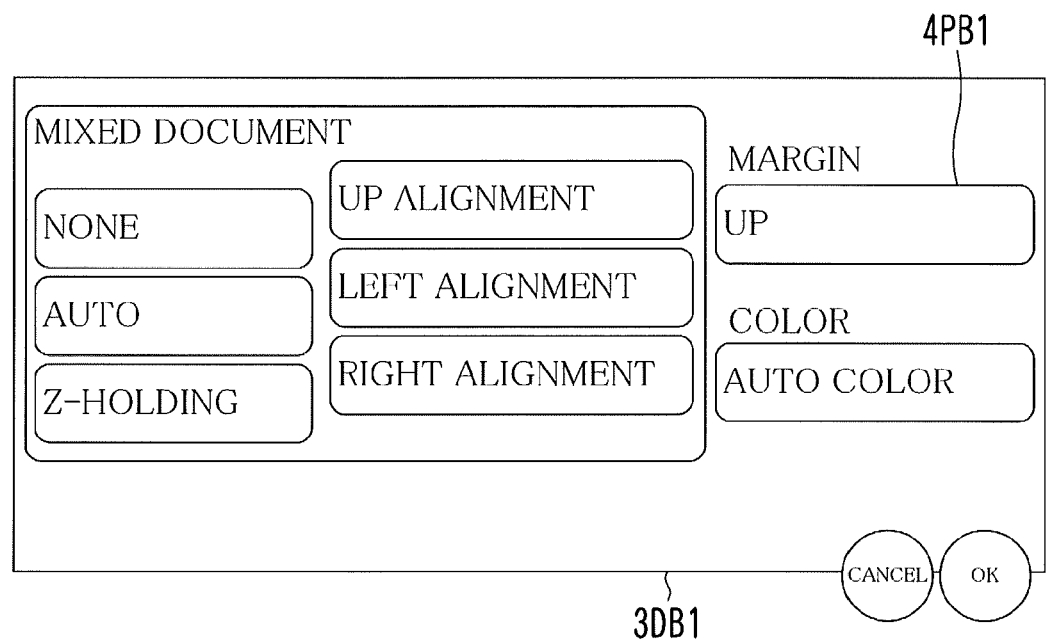
FIGS. 14A and 14B are diagrams showing examples of a dialog box.
Figure 14B:
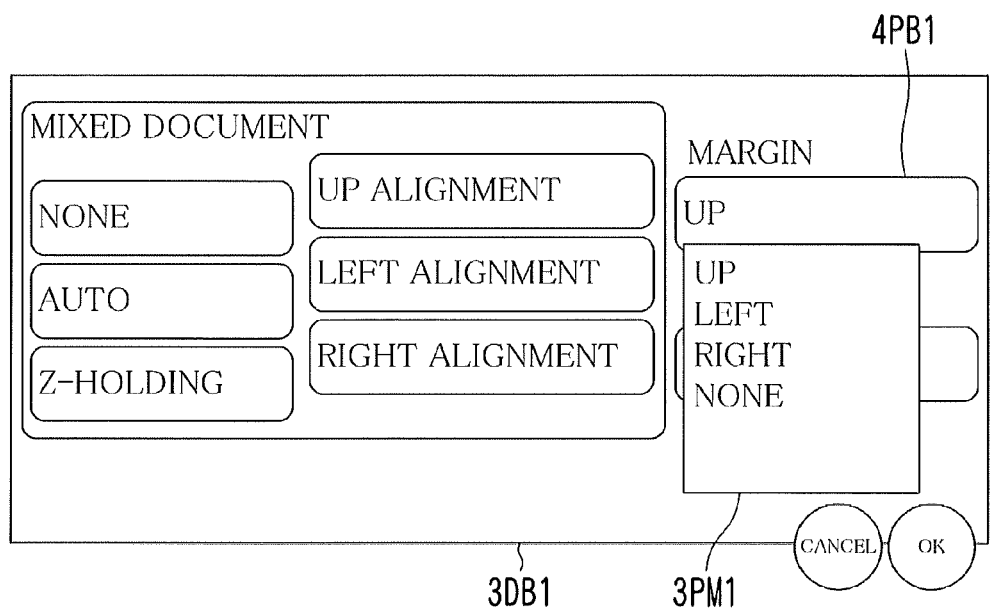

FIG. 13 is a diagram showing an example of the copy job screen 3C. FIGS. 14A and 14B are diagrams showing examples of a dialog box 3DB1.

In some cases, a menu or a dialog is displayed above the current screen in response to specific operation on a specific object. The speed at which the menu or the dialog is displayed is set to be smaller in the reproduction mode than in the normal mode.

For example, when the optional function icon 4Ca is tapped in the copy job screen 3C of FIG. 13, the dialog box 3DB1 as shown in FIG. 14A is displayed above the copy job screen 3C.

If the response processing is determined to be processing of displaying the dialog box 3DB1 on the copy job screen 3C, then the condition modifying portion 133 changes a condition for start timing of this processing from the current condition to a condition that the start timing is delayed by time Ts2 (2.0 seconds, for example).

The screen control portion 108 performs the response processing based on the post-change condition. Thereby, the dialog box 3DB1 is displayed time Ts2 late, as compared with the case of the normal mode.

The operation log read-out portion 131 delays conveying the next record, by time Ts2, to any one of the operation region determination portion 102, the touch response processing determination portion 103, the gesture determination portion 104, and the hardware key response processing determination portion 107. This causes a delay, by time Ts2 as a whole, in the series of operation after display of the dialog box 3DB1.

Thereafter, when a pull-down button 4PB is further tapped on the dialog box 3DB1, a pull-down menu 3PM1 is displayed above the dialog box 3DB1 as shown in FIG. 14B.

If the response processing is determined to be processing of displaying the pull-down menu 3PM1 on the dialog box 3DB1, then the condition modifying portion 133 changes a condition for start timing of this processing from the current condition to a condition that the start timing is delayed by time Ts3 (2.0 seconds, for example).

The screen control portion 108 performs the response processing based on the post-change condition. Thereby, the pull-down menu 3PM1 is displayed time Ts3 late, as compared with the case of the normal mode.

The operation log read-out portion 131 delays conveying the next record, by time Ts3, to any one of the operation region determination portion 102, the touch response processing determination portion 103, the gesture determination portion 104, and the hardware key response processing determination portion 107. This causes a delay, by time Ts3 as a whole, in the series of operation after display of the pull-down menu 3PM1.

[Case where Message Window is Displayed Above the Current Screen]

Figure 15A:
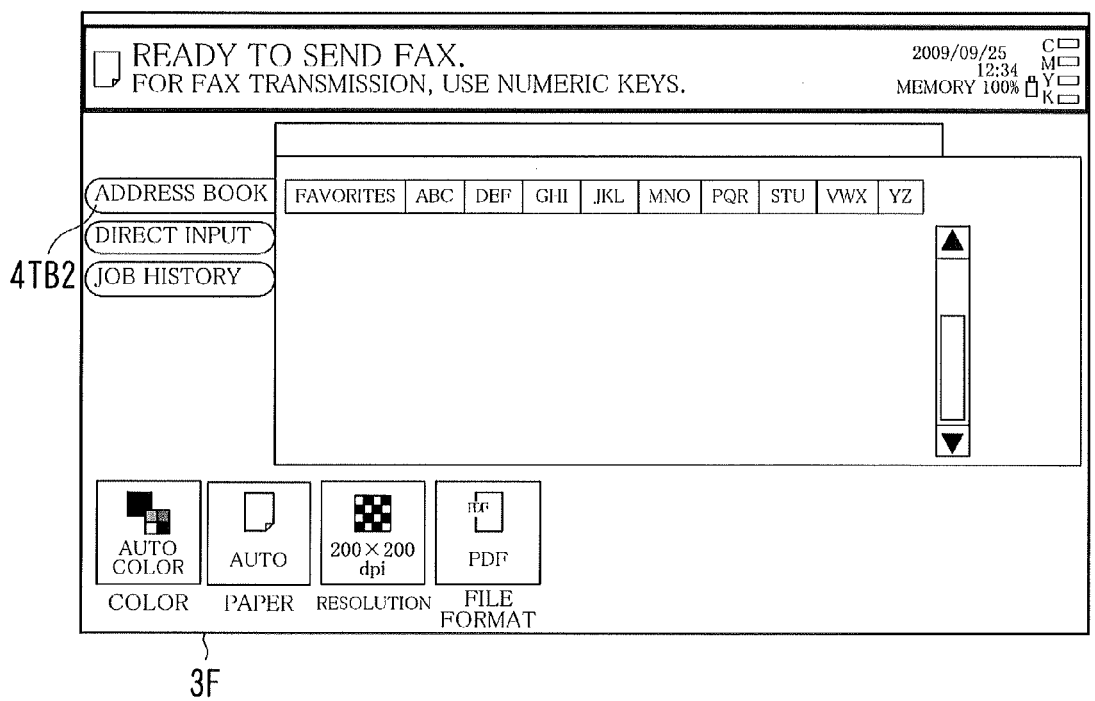
FIGS. 15A and 15B are diagrams showing examples of a fax transmission job screen.
Figure 15B:
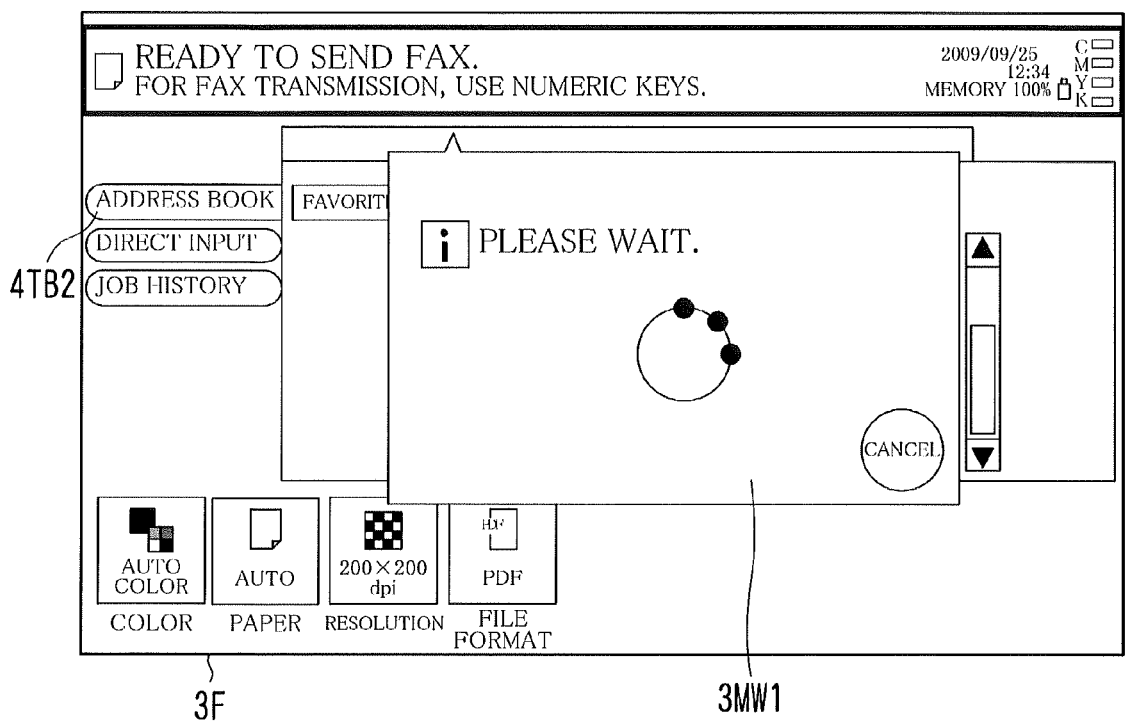
Figure 16A:
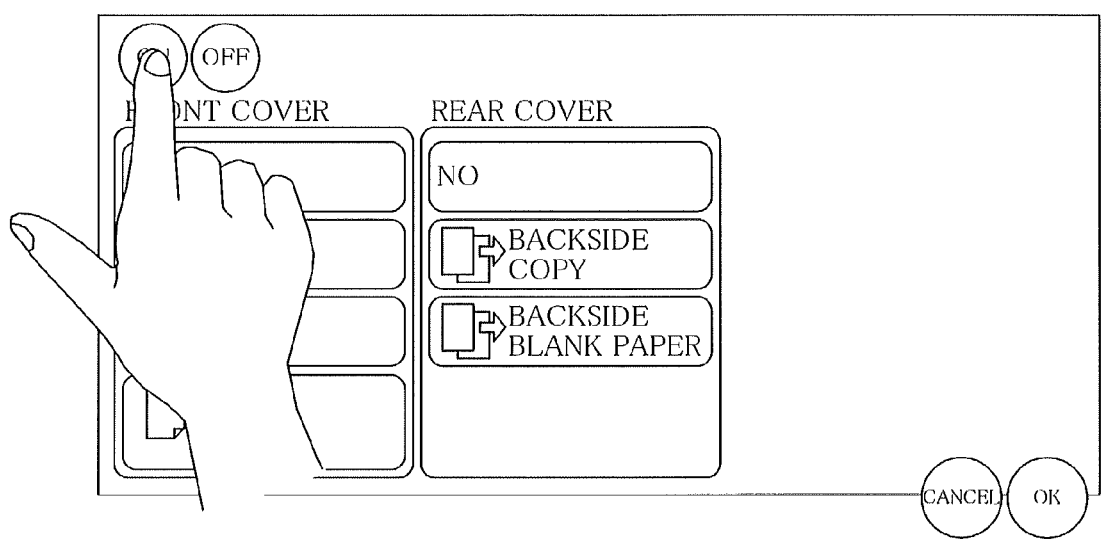
FIGS. 16A and 16B are diagrams showing examples of a copy settings dialog box.
Figure 16B:
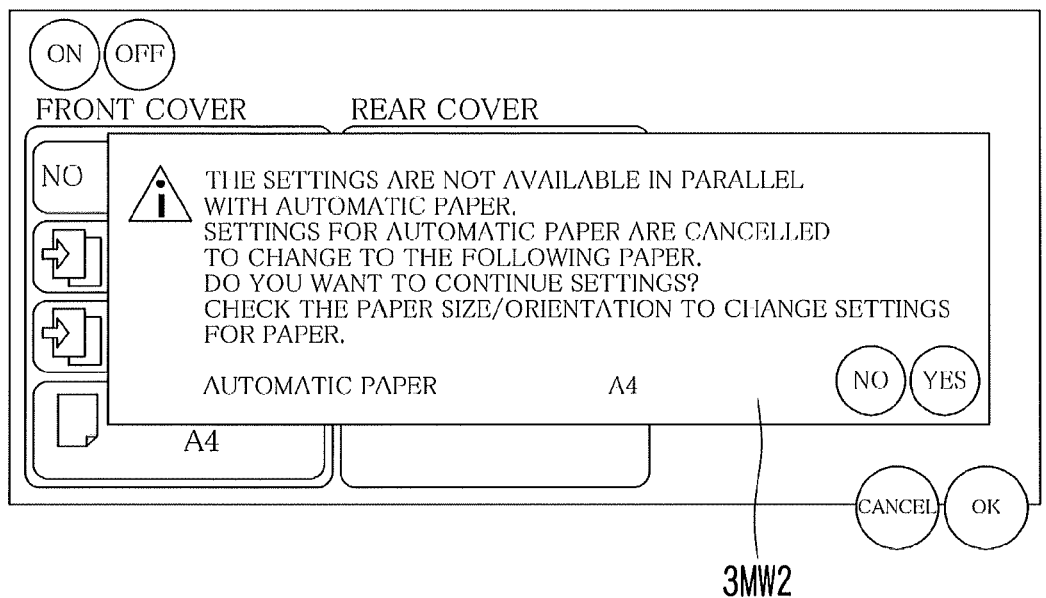

FIGS. 15A and 15B are diagrams showing examples of a fax transmission job screen 3F. FIGS. 16A and 16B are diagrams showing examples of a copy settings dialog box 3DB2.

In some cases, a message window is displayed above the current screen in response to notification from the operating system. The speed at which the message window is displayed is set to be smaller in the reproduction mode than in the normal mode.

For example, when a tab 4TB2 is tapped in the fax transmission job screen 3F of FIG. 15A, data on the address book is read out from the large-capacity storage 10d or downloaded from a server to display a destination list of members registered in the address book. In the case where it takes a time longer than a predetermined time, to readout or download the data on the address book, a message window 3MW1 as shown in FIG. 15B is displayed on the fax transmission job screen 3F in accordance with the notification from the operating system. The message window 3MW1 is automatically closed after the data is completely read out or downloaded.

The condition modifying portion 133 changes a condition for start timing of the processing for displaying the message window 3MW1 from the current condition to a condition that the start timing is delayed by time Ts4 (2.0 seconds, for example).

The screen control portion 108 performs the processing based on the post-change condition. Thereby, the message window 3MW1 is displayed time Ts4 late, as compared with the case of the normal mode.

At a time when the message window 3MW1 is closed, the operation log read-out portion 131 conveys the next record to any one of the operation region determination portion 102, the touch response processing determination portion 103, the gesture determination portion 104, and the hardware key response processing determination portion 107.

In a situation where paper to be used for copying is set at "automatic", when the user attempts to switch an option to use inter sheet or coversheet from OFF to ON in the copy settings dialog box 3DB2 of FIG. 16A, a message window 3MW2 as shown in FIG. 16B is displayed based on the notification from the operating system.

In the reproduction mode, the condition modifying portion 133 changes a condition for start timing of the processing for displaying the message window 3MW2 from the current condition to a condition that the start timing is delayed by time Ts5 (2.0 seconds, for example).

The screen control portion 108 performs the processing based on the post-change condition. Thereby, the message window 3MW2 is displayed time Ts5 late, as compared with the case of the normal mode.

The operation log read-out portion 131 delays conveying the next record, by time Ts5, to any one of the operation region determination portion 102, the touch response processing determination portion 103, the gesture determination portion 104, and the hardware key response processing determination portion 107. This causes a delay, by time Ts5 as a whole, in the series of operation after display of the message window 3MW2.

[Case where the Current Screen is Scrolled]

Figure 17A:
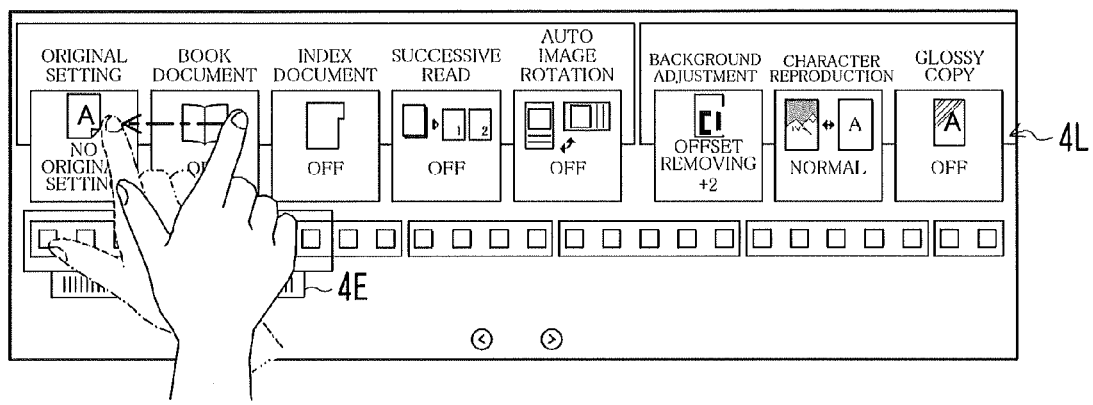
FIGS. 17A and 17B are diagrams showing examples of an icon row and the surrounding image.
Figure 17B:
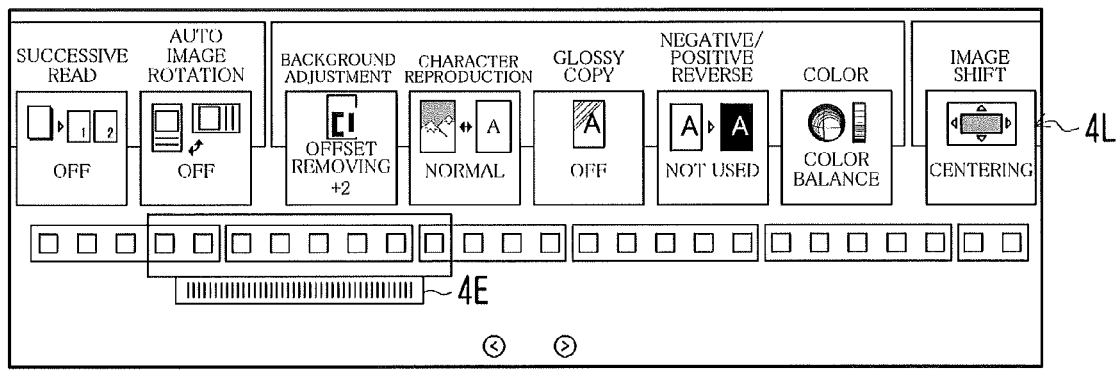

FIGS. 17A and 17B are diagrams showing examples of the icon row 4L and the surrounding image.

In some cases, a part or the whole of the current screen is scrolled in response to specific operation on a specific object. The scroll speed is set to be smaller in the reproduction mode than in the normal mode.

For example, as shown in FIG. 17A, when a user flicks left at any position of the icon row 4L on the copy job screen 3C (see FIG. 13), the icon row 4L is scrolled as shown in FIG. 17B.

If the response processing is determined to be processing of scrolling across the icon row 4L, then the condition modifying portion 133 changes a condition for scroll speed from the current condition to a condition that the scroll speed is set to be smaller, by a predetermined ratio Rs1, than the speed indicated in the condition value 5C.

The screen control portion 108 performs the response processing based on the post-change condition. Thereby, the icon row 4L is scrolled across at a speed smaller, by the predetermined ratio Rs1, than that in the normal mode.

The operation log read-out portion 131 delays conveying the next record, by a time corresponding to the delay due to the reduced scroll speed, to any one of the operation region determination portion 102, the touch response processing determination portion 103, the gesture determination portion 104, and the hardware key response processing determination portion 107.

[Case where Icon is Moved in Response to Drag Action]

Figure 18:
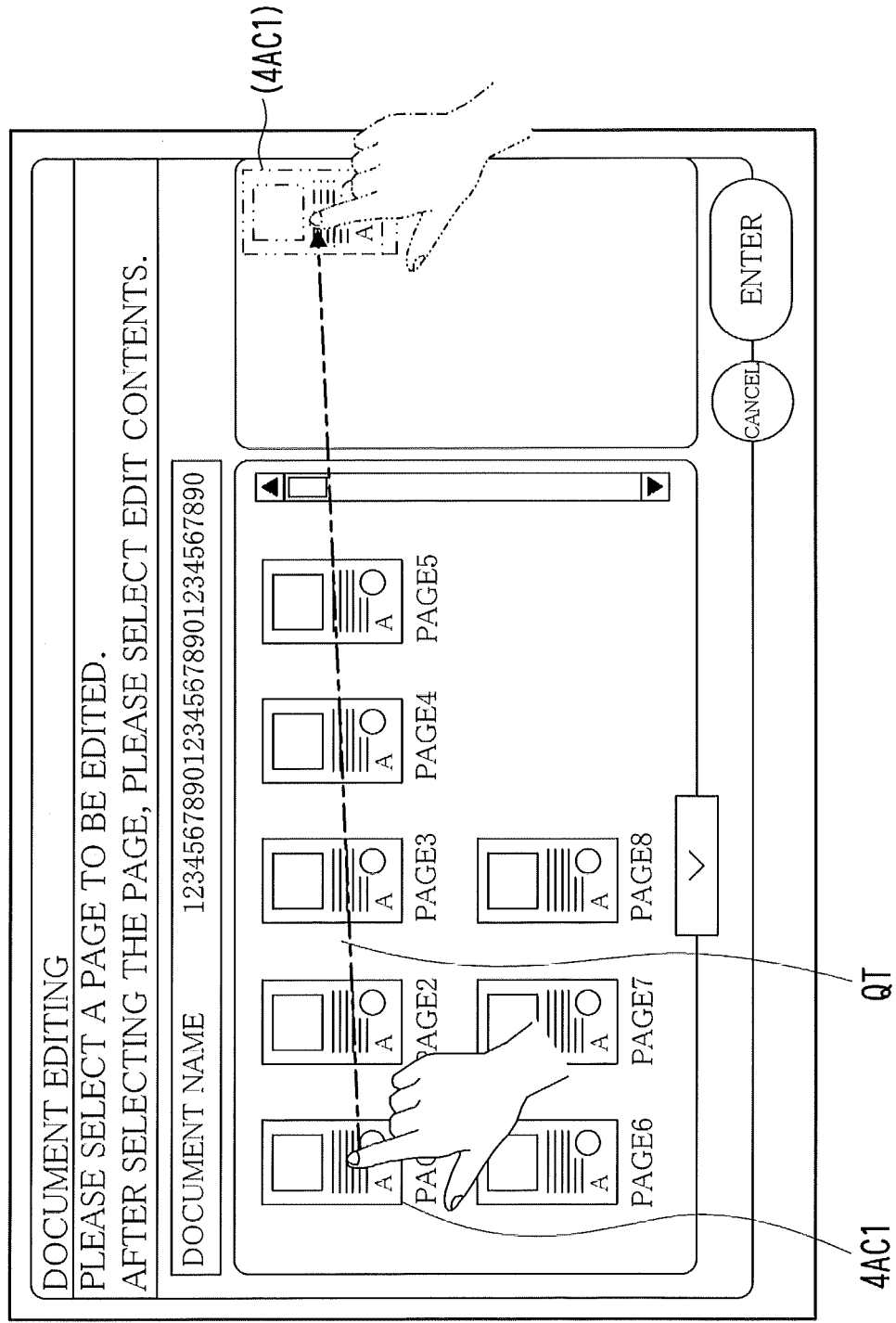
FIG. 18 is a diagram showing an example of a screen transition for a drag action.

FIG. 18 is a diagram showing an example of a screen transition for a drag action.

In some cases, an icon moves on the current screen in response to a drag made on the icon. The movement speed is set to be smaller in the reproduction mode than in the normal mode.

For example, as shown in FIG. 18, when an icon 4AC1 is dragged, the icon 4AC1 moves in accordance with the touched position QT.

In order to reproduce the movement of the icon 4AC1 due to the drag action, the condition modifying portion 133 changes a condition for movement speed from the current condition to a condition that the movement speed is set to be smaller, by a predetermined ratio Rs2, than that in the normal mode. The original movement speed (movement speed at the time of making a record of operation) can be determined based on the condition value 5C.

The screen control portion 108 performs the processing for moving the icon 4AC1 based on the post-change condition. Thereby, the icon 4AC1 is moved at a speed smaller, by the predetermined ratio Rs2, than that in the normal mode.

The operation log read-out portion 131 delays conveying the next record, by a time corresponding to the delay due to the reduced movement speed, to any one of the operation region determination portion 102, the touch response processing determination portion 103, the gesture determination portion 104, and the hardware key response processing determination portion 107.

[Application of Animation Effect]

Figure 19A:
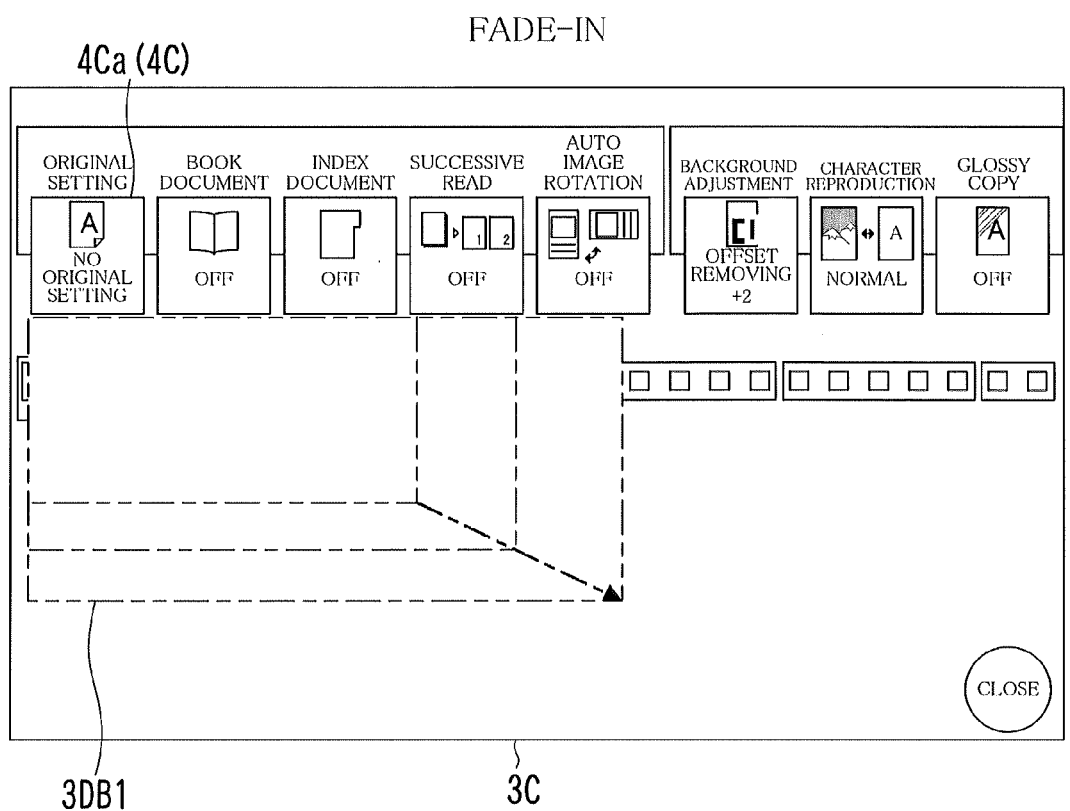
FIGS. 19A and 19B are diagrams showing examples of a dialog box transition.
Figure 19B:
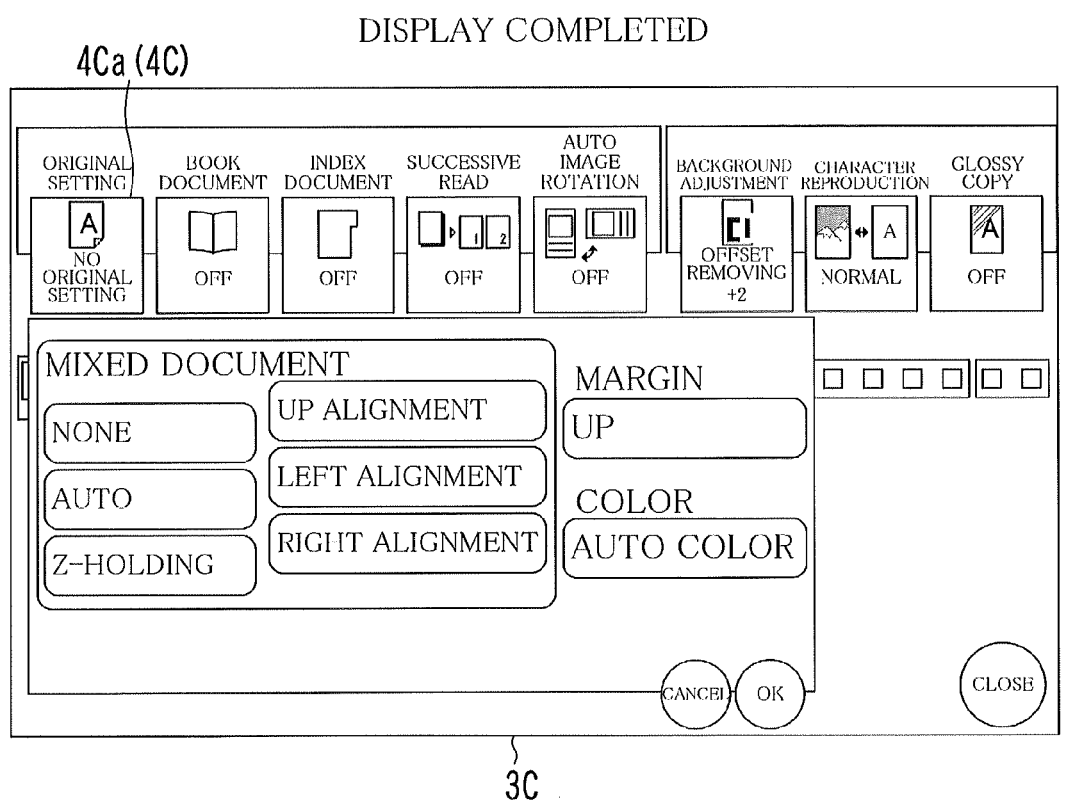
Figure 20B:
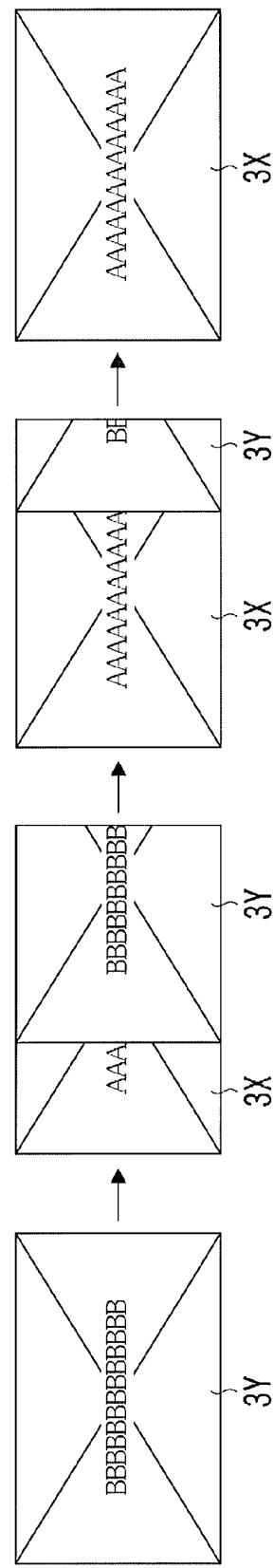

FIGS. 19A and 19B are diagrams showing examples of a transition of the dialog box 3DB1. FIGS. 20A and 20B are diagrams showing examples of a screen transition with an animation effect used.

In some cases, a dialog box or a pull-down menu is displayed on the current screen with an effect such as a slide-in or a fade-in (so-called an animation effect) applied. If settings for the animation effect are OFF, a dialog box or a pull-down menu is displayed with no animation effect applied. However, even if settings for the animation effect are OFF, it is possible in the reproduction mode to display a dialog box or a pull-down with an animation effect applied.

For example, as described earlier, when the optional function icon 4Ca (see FIG. 13) is tapped on the copy job screen 3C, the dialog box 3DB1 (see FIG. 14A) is displayed on the copy job screen 3C.

In the reproduction mode, even if settings for the animation effect are OFF, the condition modifying portion 133 modifies conditions for displaying the dialog box 3DB1 in such a manner that the animation effect is applied.

The screen control portion 108 performs, based on the post-change conditions, processing of gradually displaying the dialog box 3DB1 by applying the fade-in effect as shown in FIG. 19A. If the animation effect is applied although the settings for the animation effect are OFF, it takes time to completely display the dialog box 3DB1 as shown in FIG. 19A longer than the case where operation was recorded. In view of this, the operation log read-out portion 131 delays conveying the next record, by a time corresponding to the longer time, to any one of the operation region determination portion 102, the touch response processing determination portion 103, the gesture determination portion 104, and the hardware key response processing determination portion 107.

In another case, in order to change the current screen from a screen 3X to another screen 3Y, the slide-in effect may be applied as shown in FIG. 20A. In order to change again the current screen from the screen 3Y to the screen 3X, a slide-out effect may be applied as shown in FIG. 20B.

[Display of Touched Position]

Figure 21:
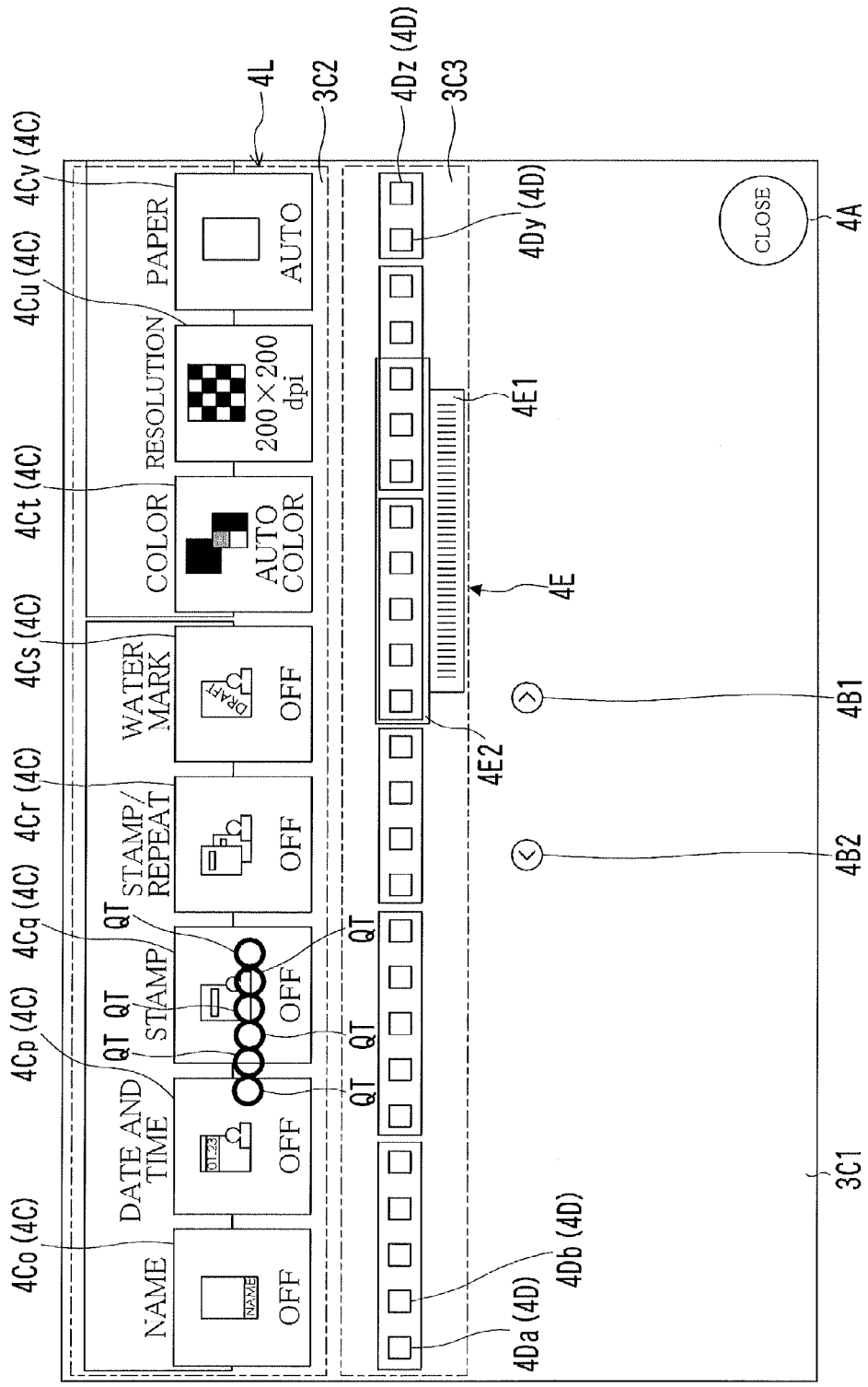
FIG. 21 is a diagram showing an example of a mark of a touched position for a flick action.
Figure 22:
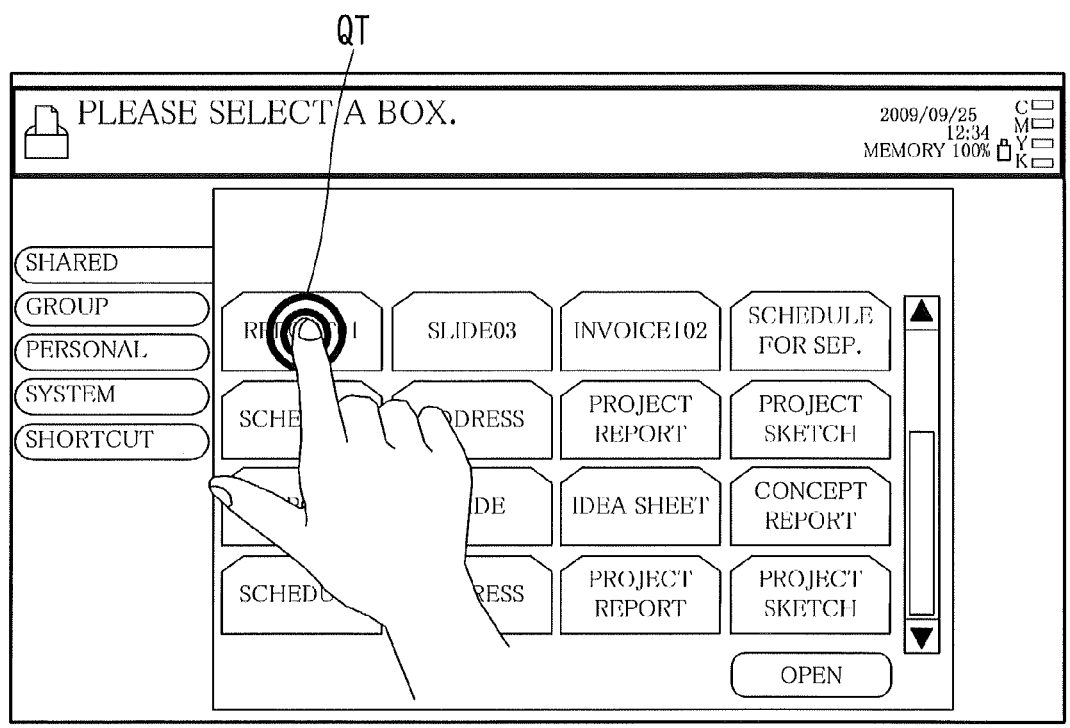
FIG. 22 is a diagram showing an example of a mark of a touched position for a double-tap action.
Figure 23A:
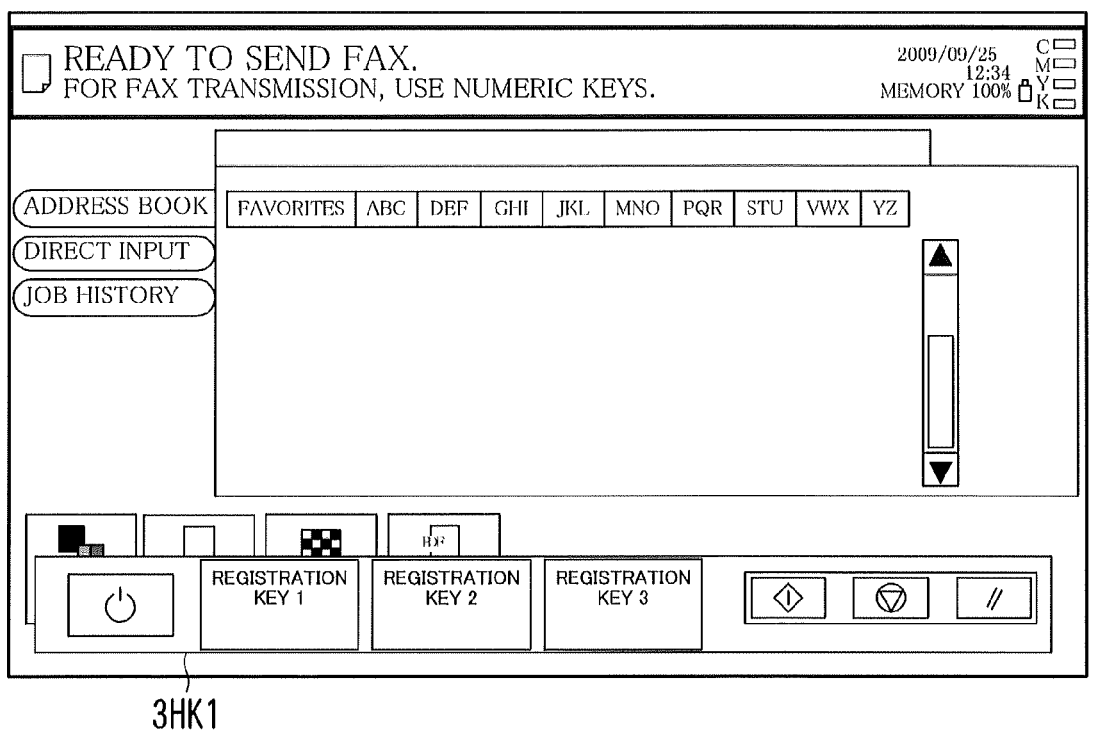
FIGS. 23A and 23B are diagrams showing examples of a partial image of a hardware key panel.
Figure 23B:
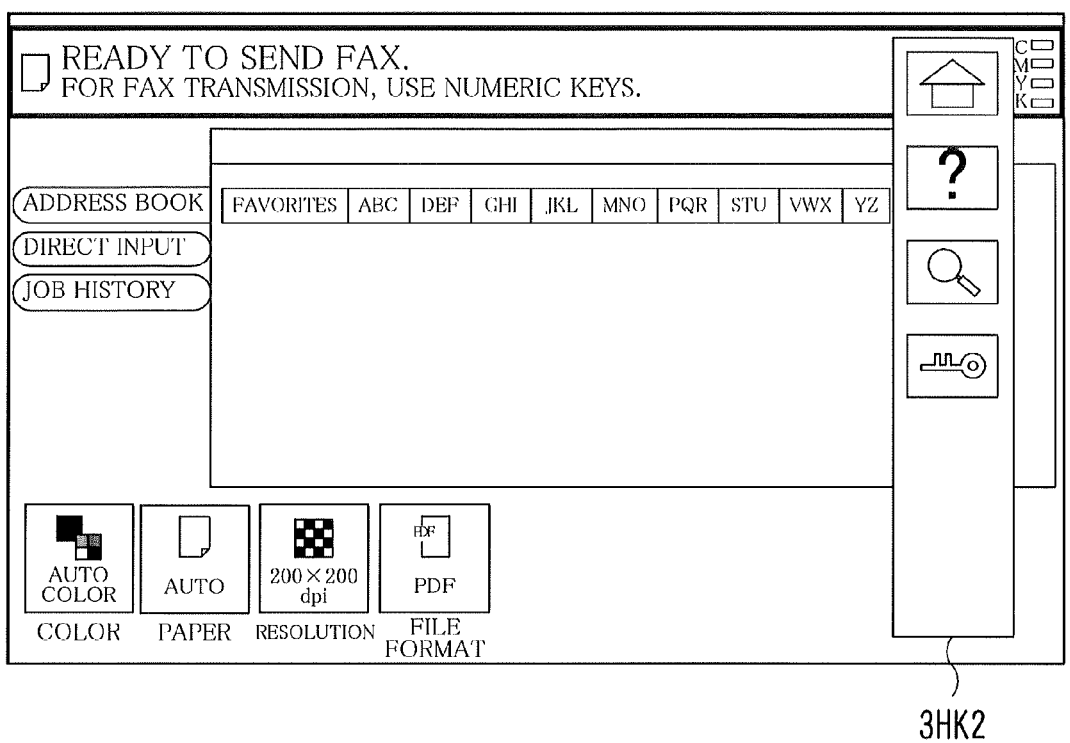

FIG. 21 is a diagram showing an example of a mark of a touched position QT for a flick action. FIG. 22 is a diagram showing an example of a mark of a touched position QT for a double-tap action. FIGS. 23A and 23B are diagrams showing examples of a partial image of the hardware key panel 10k1.

The reproduction of operation based on the operation log data 5F causes screen transition as discussed above. The user can presume what kind of operation was made by looking at the screen transition.

For the sake of further easy presumption by the user, the screen control portion 108 may display a mark representing the touched position QT on the screen. For example, as shown in FIG. 21, a mark representing some or all of the touched position QT for a flick may be displayed as the lotus. This enables the user to presume the magnitude of the flick easily.

Alternatively, it is possible to change the style of the mark representing the touched position QT in accordance with a gesture determined by the gesture determination portion 104. For example, for the case of flick, the screen control portion 108 displays, as the mark representing the touched position QT, a perfect circle drawn by a heavy line as shown in FIG. 21. For the case of drag, a triangle drawn by a dotted line is displayed as the mark representing the touched position QT.

For the case of double-tap, the screen control portion 108 displays a double circle as shown in FIG. 22. Alternatively, it is possible to display an inner circle in response to the first tap (a series of touch from press to release) and display an outer circle in response to the second tap. Yet alternatively, it is possible to display the outer circle at a time later than a time, indicated in the operation log data 5F, at which the second tap is made. If the second tap causes some kind of change on the screen (the button is recessed or the checkbox is checked, for example), it is also possible to delay the time for such a change.

Even if operation on the hardware key panel 10k1 is reproduced, the user sometimes cannot presume which key was pressed. To cope with this, the screen control portion 108 may display an image of the hardware key panel 10k1 on the screen to display a mark on the pressed key. Instead of displaying the entire image of the hardware key panel 10k1, a partial image thereof may be displayed. The hardware key panel 10k1 may be displayed only when operation on the hardware key panel 10k1 is reproduced, instead of being always displayed.

For example, during a predetermined period including a point in time when the function key 1kf1 is touched, the screen control portion 108 displays the hardware key panel lower screen 3HK1 showing a lower part of the hardware key panel 10k1 as shown in FIG. 23A. Then, a predetermined mark (star mark, for example) is displayed on the image of the function key 1kf1. Likewise, if the operation log data 5F shows the function key 1kf4, then the screen control portion 108 displays a hardware key panel right screen 3HK2 as shown in FIG. 23B. Then, the predetermined mark is displayed on the image of the function key 1kf4. It is desirable that a time at which the mark is displayed is later than the time indicated in the operation log data 5F.

Figure 24:
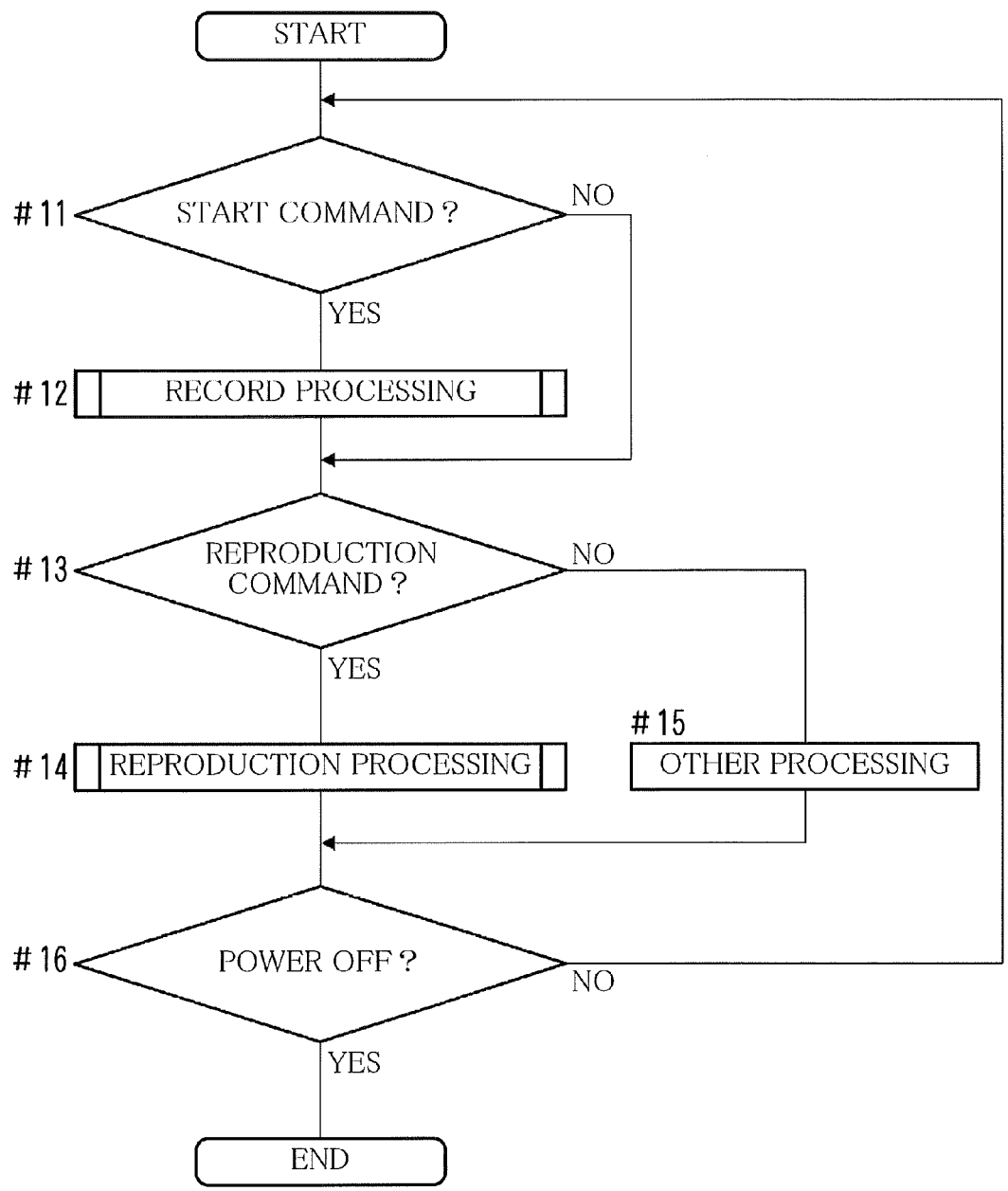
FIG. 24 is a flowchart depicting an example of the flow of the entire processing performed by an image forming apparatus.
Figure 25:
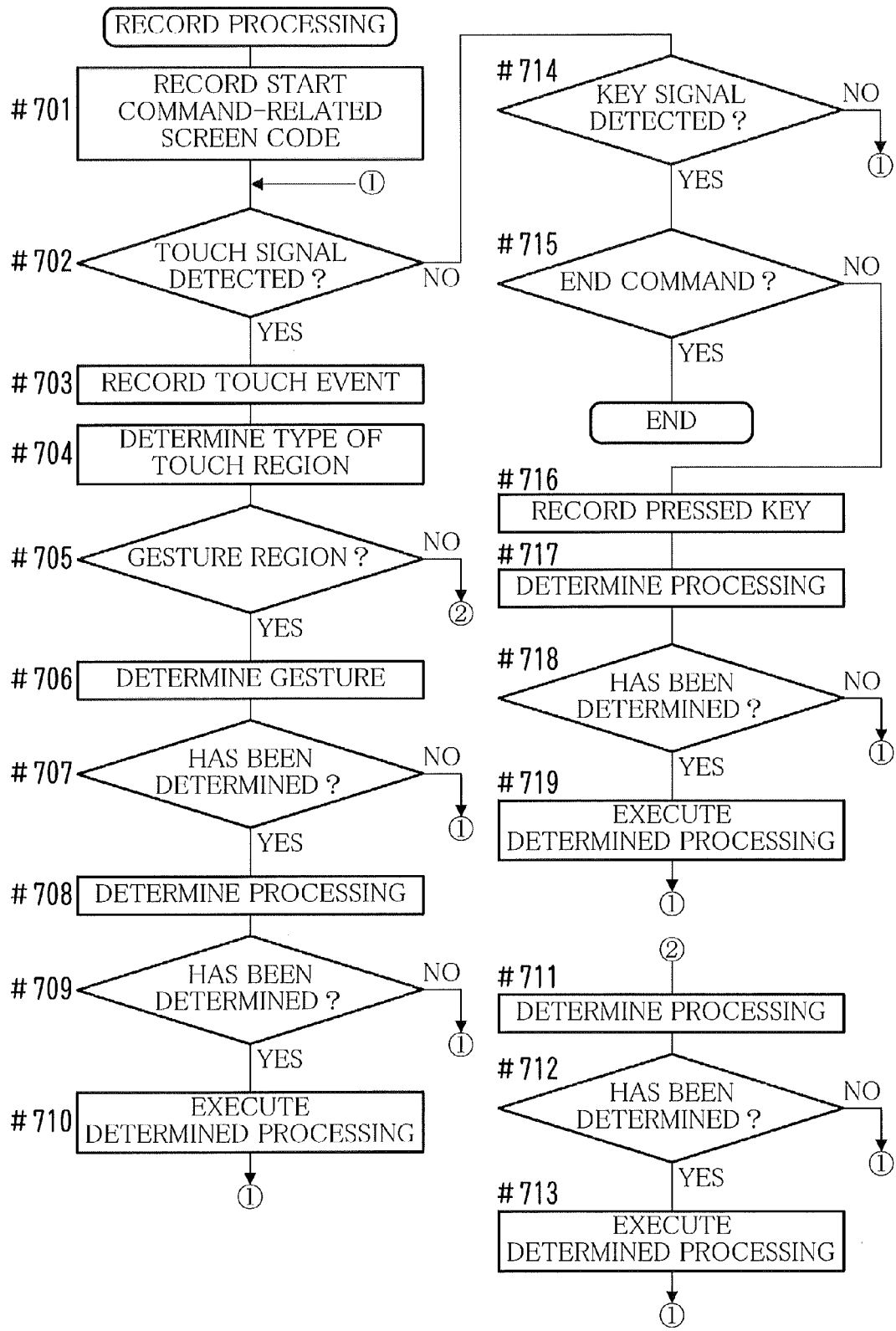
FIG. 25 is a flowchart depicting an example of the flow of record processing.
Figure 26:
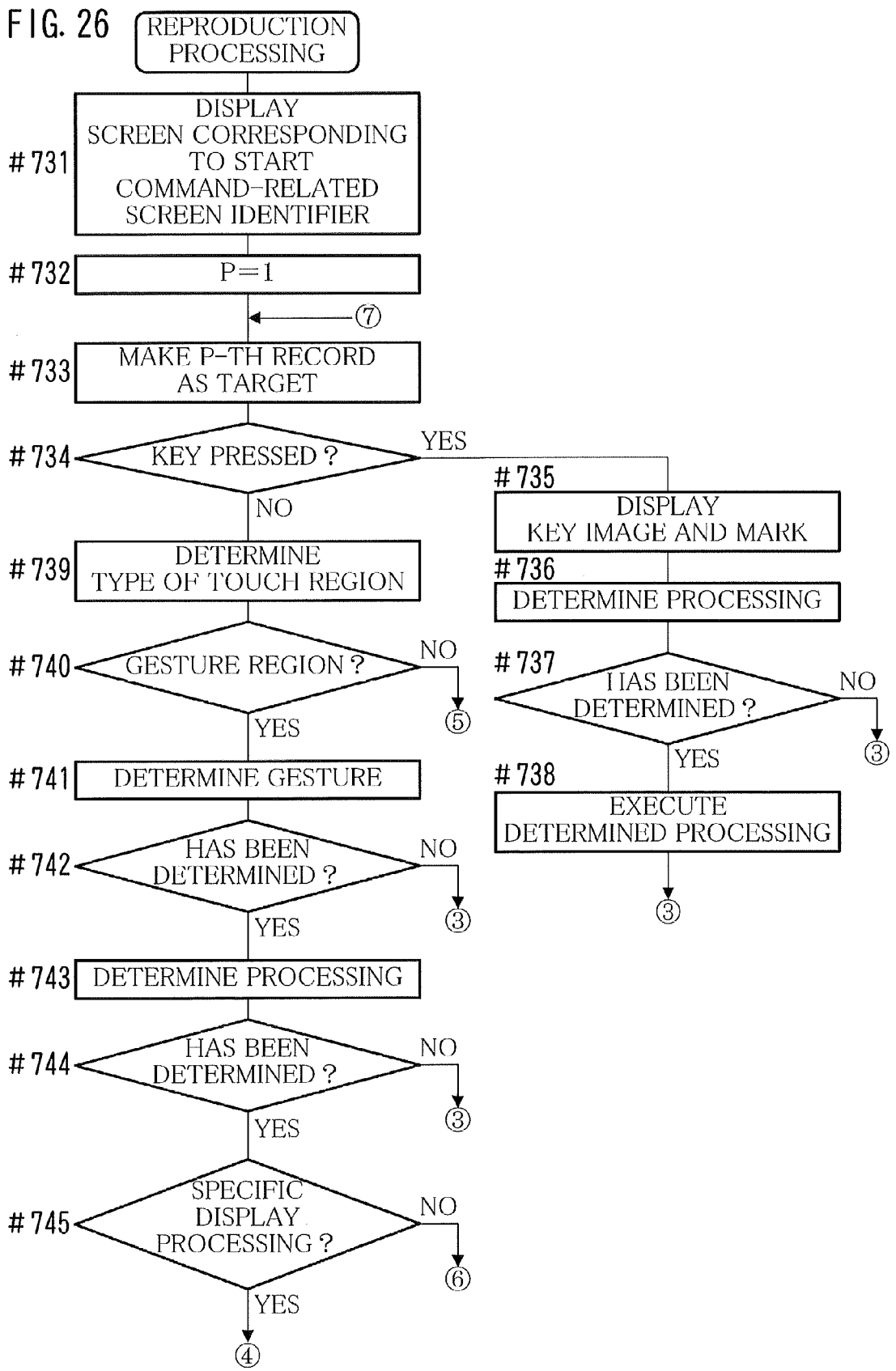
FIG. 26 is a flowchart depicting an example of the flow of reproduction processing.
Figure 27:
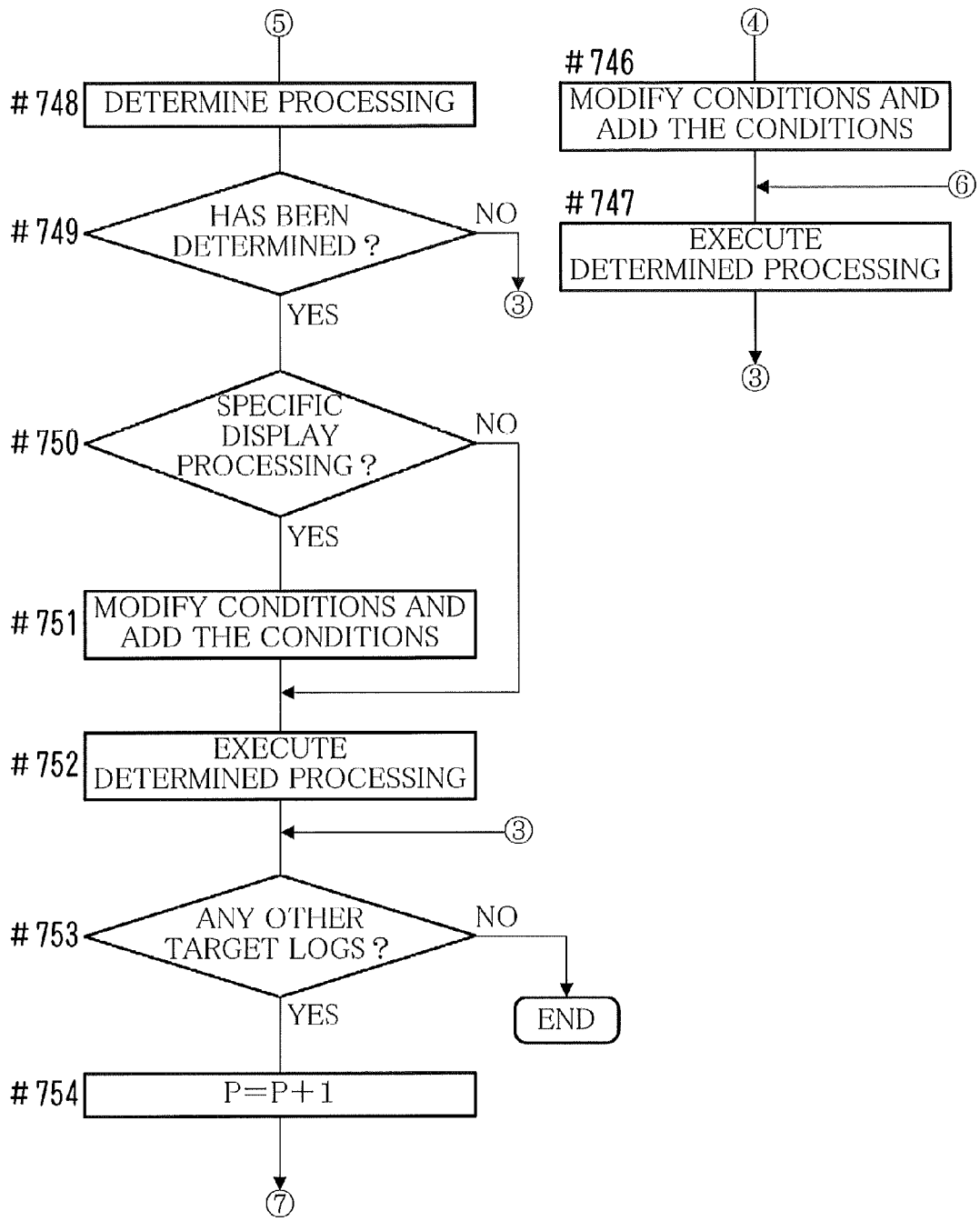
FIG. 27 is a flowchart depicting an example of the flow of reproduction processing.

FIG. 24 is a flowchart depicting an example of the flow of the entire processing performed by the image forming apparatus 1. FIG. 25 is a flowchart depicting an example of the flow of record processing. FIGS. 26 and 27 are flowcharts depicting an example of the flow of reproduction processing.

The description goes on to the flow of the entire processing related to display in the image forming apparatus 1 with reference to the flowcharts of FIG. 24, and so on.

While being ON, the image forming apparatus 1 performs processing as shown in FIG. 24 in accordance with operation by the user on the operating panel unit 10k.

To be specific, when a start command is entered (YES in Step #11), the image forming apparatus 1 performs processing for making a record of operation logs in the steps as depicted in FIG. 25 (Step #12).

Referring to FIG. 25, the image forming apparatus 1 generates empty operation log data 5F to correlate the empty operation log data 5F with a start command-related screen identifier of the current screen (Step #701).

If receiving a touched position signal 5A through the touch panel 10k3 (YES in Step #702), then the image forming apparatus 1 calculates the touched position QT to determine the touch event, and makes one record including the pieces of information and the elapsed time Tr to add the record to the operation log data 5F (Step #703). The image forming apparatus 1 then determines the type of a region within which the touched position QT are located, namely, determines whether the region is a simple operation region or a gesture region (Step #704).

If the region is determined to be a gesture region (YES in Step #705), then the image forming apparatus 1 attempts to determine what kind of gesture was made by the user (Step #706). As the gesture is represented by a combination of touches, the gesture sometimes cannot be determined at this point in time. If determining the kind of the gesture (YES in Step #707), then the image forming apparatus 1 attempts to determine processing to be executed in response to the gesture (Step #708). If determining the processing to be executed (YES in Step #709), then the image forming apparatus 1 executes the processing (Step #710).

On the other hand, if the region is determined to be a simple operation region (NO in Step #705), then the image forming apparatus 1 attempts to determine processing to be executed in response to the touch event (Step #711). If determining the processing to be executed (YES in Step #712), then the image forming apparatus 1 executes the processing (Step #713).

Alternatively, if the image forming apparatus 1 receives a pressed key signal 5D through the hardware key panel 10k1 (NO in Step #702, and YES in Step #714), and if the pressed key signal 5D indicates no start/end command key 1kf2 (NO in Step #715), then the image forming apparatus 1 makes one record including the pressed key signal 5D and the elapsed time Tr, and adds the record to the operation log data 5F (Step #716). The image forming apparatus 1 then attempts to determine processing to be executed in response to the pressed key (Step #717). If determining the processing to be executed (YES in Step #718), then the image forming apparatus 1 executes the processing (Step #719).

The image forming apparatus 1 performs the processing of Step #702 through Step #719 appropriately until the start/end command key 1kf2 is pressed.

When receiving a pressed key signal 5D indicating the start/end command key 1kf2 (YES in Step #715), the image forming apparatus 1 finishes the processing for making a record of operation logs.

Referring back to FIG. 24, when a reproduction command is entered (Yes in Step #13), the image forming apparatus 1 performs processing for reproducing user operation based on the operation log data 5F in the steps as depicted in FIGS. 26 and 27 (Step #14).

The image forming apparatus 1 reads out the operation log data 5F to display a screen corresponding to the start command-related screen identifier correlated with the operation log data 5F (Step #731 of FIG. 26).

The image forming apparatus 1 makes, as a target, the topmost record of the operation log data 5F (Step #732 and Step #733).

If the target record indicates a pressed key signal 5D (YES in Step #734), then the image forming apparatus 1 displays, as exemplified in FIG. 23, the image of the hardware key panel 10k1 on the current screen and displays a mark on a key indicated in the pressed key signal 5D (Step #735). It is desirable that the mark is displayed at a time later than that indicated in the operation log data 5F. The image forming apparatus 1 then attempts to determine processing to be executed in response to the pressed key (Step #736). If determining the processing to be executed (Yes in Step #737), then the image forming apparatus 1 executes the processing (Step #738).

On the other hand, if the target record indicates a touched position QT, a touch event, and an elapsed time Tr (NO in Step #734), then the image forming apparatus 1 determines the type of a region within which the touched position QT is located (Step #739).

If the region is determined to be a gesture region (YES in Step #740), then the image forming apparatus 1 attempts to determine the kind of gesture (Step #741). If determining the kind of gesture (YES in Step #742), then the image forming apparatus 1 attempts to determine processing to be executed in response to the gesture (Step #743). If determining the processing to be executed (YES in Step #744), and if the processing to be executed includes specific processing (YES in Step #745), then the image forming apparatus 1 modifies the processing conditions (Step #746 of FIG. 27). For example, the image forming apparatus 1 delays the time at which a screen is displayed. Alternatively, the image forming apparatus 1 turns on the animation effect. Yet alternatively, the image forming apparatus 1 adds a step of displaying a mark on the touched position QT. After that, the image forming apparatus 1 executes the processing (Step #747) which is determined in Step #743 and of which conditions are modified appropriately in Step #746.

If the region is determined to be a simple operation region (NO in Step #740), then the image forming apparatus 1 attempts to determine processing to be executed in response to the touch event (Step #748). If determining the processing to be executed (YES in Step #749), and if the processing to be executed includes specific processing (YES in Step #750), then the image forming apparatus 1 modifies the processing conditions (Step #751) as with the case of the gesture region. After that, the image forming apparatus 1 then executes the processing (Step #752) which is determined in Step #748 and of which conditions are modified appropriately in Step #751.

If the operation log data 5F has records that have not yet been regarded as targets (YES in Step #753), then the processing goes back to Step #733 in which the image forming apparatus 1 makes, among the records having not yet been regarded as targets, the topmost record as a target to execute the processing appropriately from Step #734 through Step #752.

Referring back to FIG. 24, when a command other than the operation record command and operation reproduction command is entered (NO in Step #13), the image forming apparatus 1 performs processing based on the entered command as per the conventional art (Step #15).

The description goes on to user operation, processing by the image forming apparatus 1, and screen transition with reference to FIGS. 28-35, taking an example where a binding margin of a copy is set at "left binding". In this example, the animation effect shall be set to be "OFF".

[At Time of Making Record of Operation]

Figure 28:
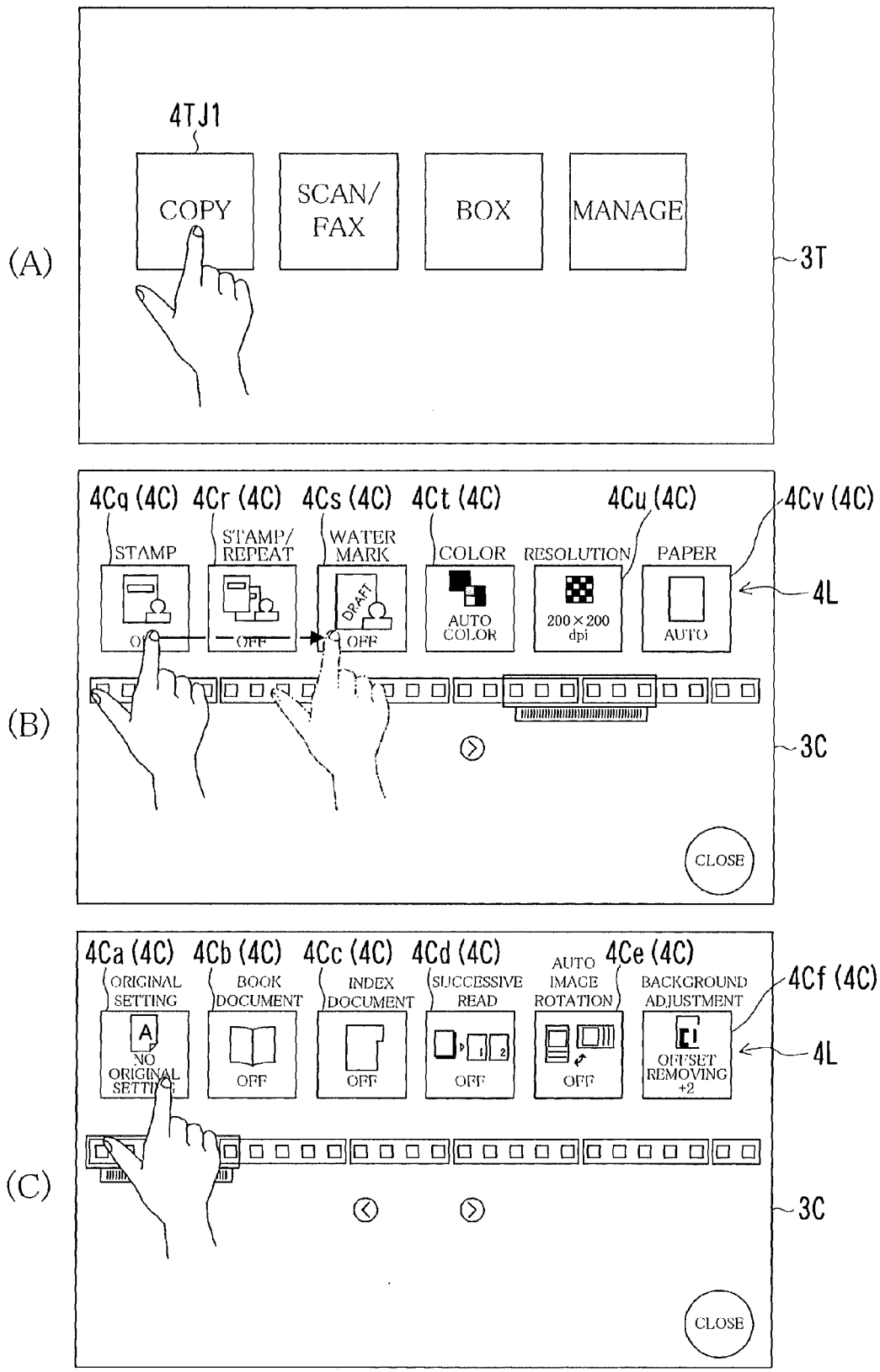
FIG. 28 is a diagram showing an example of a screen transition and user operation for the case where operation is recorded.
Figure 29:
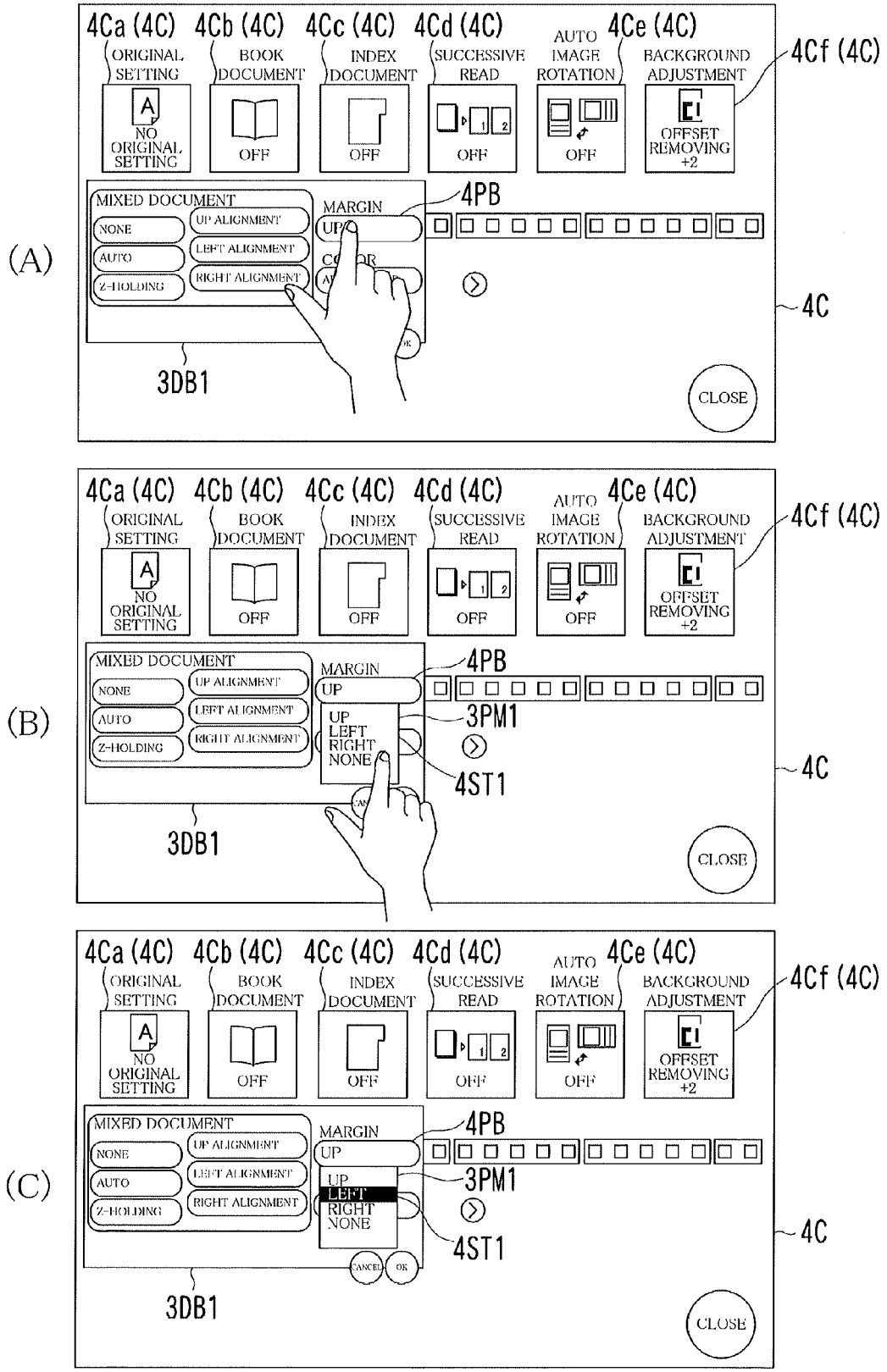
FIG. 29 is a diagram showing an example of a screen transition and user operation for the case where operation is recorded.
Figure 30:
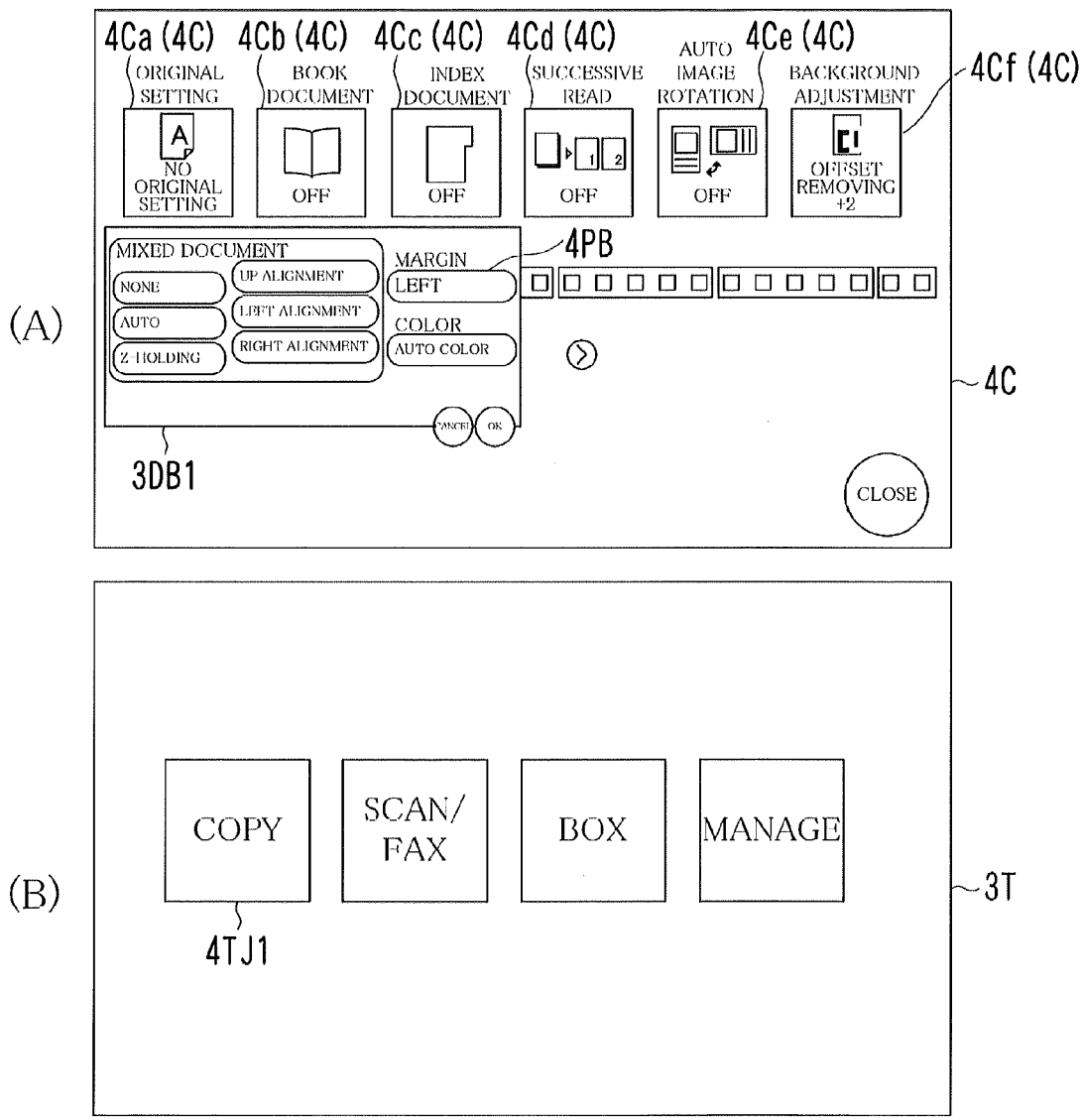
FIG. 30 is a diagram showing an example of a screen transition and user operation for the case where operation is recorded.

FIGS. 28-30 show examples of a screen transition and user operation for the case where operation is recorded.

A user enters a start command by pressing the start/end command key 1kf2 on the hardware key panel 10k1 (see FIG. 4) while the home screen 3T in (A) of FIG. 28 is displayed. The entirety of the home screen 3T corresponds to a simple operation region.

In response to entry of the start command, the image forming apparatus 1 starts making a record of operation on the hardware key panel 10k1 or the touch panel 10k3. How to make such a record is the same as that described earlier with reference to FIG. 25. To be specific, the image forming apparatus 1 first prepares empty operation log data 5F, and then, writes the content of operation into the empty operation log data 5F in due order.

The user taps a copy button 4TJ1 in the home screen 3T. In response to this operation, the image forming apparatus 1 adds a record to the operation log data 5F. The record indicates a touched position QT, a touch event (press, keep, or release), and an elapsed time Tr for each predetermined time while the user taps (touches) the copy button 4TJ1. The image forming apparatus 1 then displays the copy job screen 3C as shown in (B) of FIG. 28, instead of the home screen 3T, with no animation effect applied.

The user flicks the icon row 4L from left to right. The image forming apparatus 1 then adds, to the operation log data 5F, a record indicating a touched position QT, a touch event, and an elapsed time Tr for each predetermined time while the user flicks the icon row 4L. The user then scrolls across the icon row 4L. Thereby, the icon row 4L changes as shown in (C) of FIG. 28.

The user taps the optional function icon 4Ca. In response to the tap, the image forming apparatus 1 adds, to the operation log data 5F, a record indicating a touched position QT, a touch event, and an elapsed time Tr for each predetermined time while the user taps the optional function icon 4Ca. The image forming apparatus 1 then displays the dialog box 3DB1 above the copy job screen 3C with no animation effect applied as shown in (A) of FIG. 29.

The user taps the pull-down button 4PB. In response to the tap, the image forming apparatus 1 adds, to the operation log data 5F, a record indicating a touched position QT, a touch event, and an elapsed time Tr for each predetermined time while the user taps the pull-down button 4PB. The image forming apparatus 1 then displays the pull-down menu 3PM1 above the dialog box 3DB1 with no animation effect applied as shown in (B) of FIG. 29.

The user taps an option 4ST1 corresponding to "left binding" in the pull-down menu 3PM1. In response to the tap, the image forming apparatus 1 adds, to the operation log data 5F, a record indicating a touched position QT, a touch event, and an elapsed time Tr for each predetermined time while the user taps the option 4ST1. The image forming apparatus 1 changes the style of the option 4ST1 to a style showing that the option 4ST1 is currently selected, for example, to a style in which the character color and the background color are inverted from each other as shown in (C) of FIG. 29. When a predetermined time (0.5 seconds, for example) has elapsed since the user finished the tap, the pull-down menu 3PM1 is closed and the binding margin of a copy is set to be "left binding" as shown in (A) of FIG. 30.

The user presses the function key 1*kf*4 of the hardware key panel 10*k*1. The function key 1*kf*4 is to return to the home screen 3T. In response to the function key 1*kf*4 pressed, the image forming apparatus 1A adds a record indicating a pressed key signal 5D of the function key 1*kf*4 and an elapsed time Tr to the operation log data 5F. The image forming apparatus 1 then closes the copy job screen 3C to display the home screen 3T again as shown in (B) of FIG. 30. No animation effect is applied in such a case.

The user enters an end command by pressing the start/end command key 1*kf*2. In response to entry of the end command, the image forming apparatus 1 finishes the record processing. The image forming apparatus 1 correlates, with the operation log data 5F, an identifier of the current screen at the time when the start command was entered, i.e., an identifier of the home screen 3T, as the start command-related screen identifier.

Through the foregoing operation and processing, making a record of operation, i.e., generating operation log data 5F, is completed.

[At Time of Reproducing Operation]

FIGS. 31-35 show examples of screen transition for the case where operation is reproduced.

In order to check how to make settings for binding, the user enters a reproduction command. In response to the reproduction command, the image forming apparatus 1 performs processing in the following manner. A time at which the screen is transitioned is, in principle, in accordance with the operation log data 5F.

Figure 31:
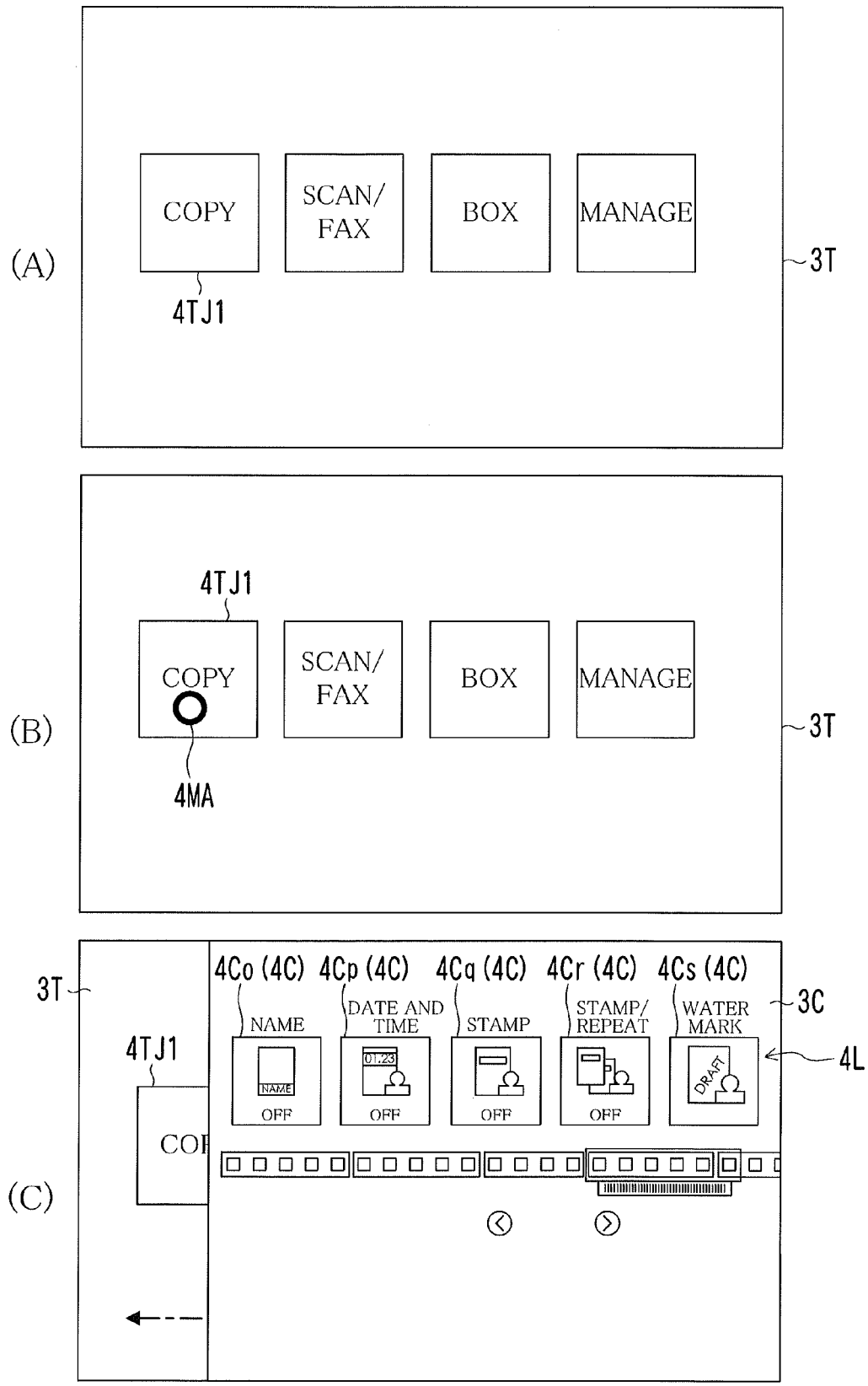
FIG. 31 is a diagram showing an example of screen transition for the case where operation is reproduced.

The image forming apparatus 1 displays the home screen 3T as shown in (A) of FIG. 31 in accordance with the start command-related screen identifier correlated with the operation log data 5F. The image forming apparatus 1 displays a mark 4MA1 representing "tap" on the copy button 4TJ1 as shown in (B) of FIG. 31 at a time for a tap (touch) indicated in the operation log data 5F. The image forming apparatus 1 then displays, instead of the home screen 3T, the copy job screen 3C as shown in (C) of FIG. 31 with a slide-in effect (see FIG. (A) of FIG. 20) applied. The image forming apparatus 1 delays the time to start displaying the copy job screen 3C as compared with the time indicated in the operation log data 5F.

Figure 32:
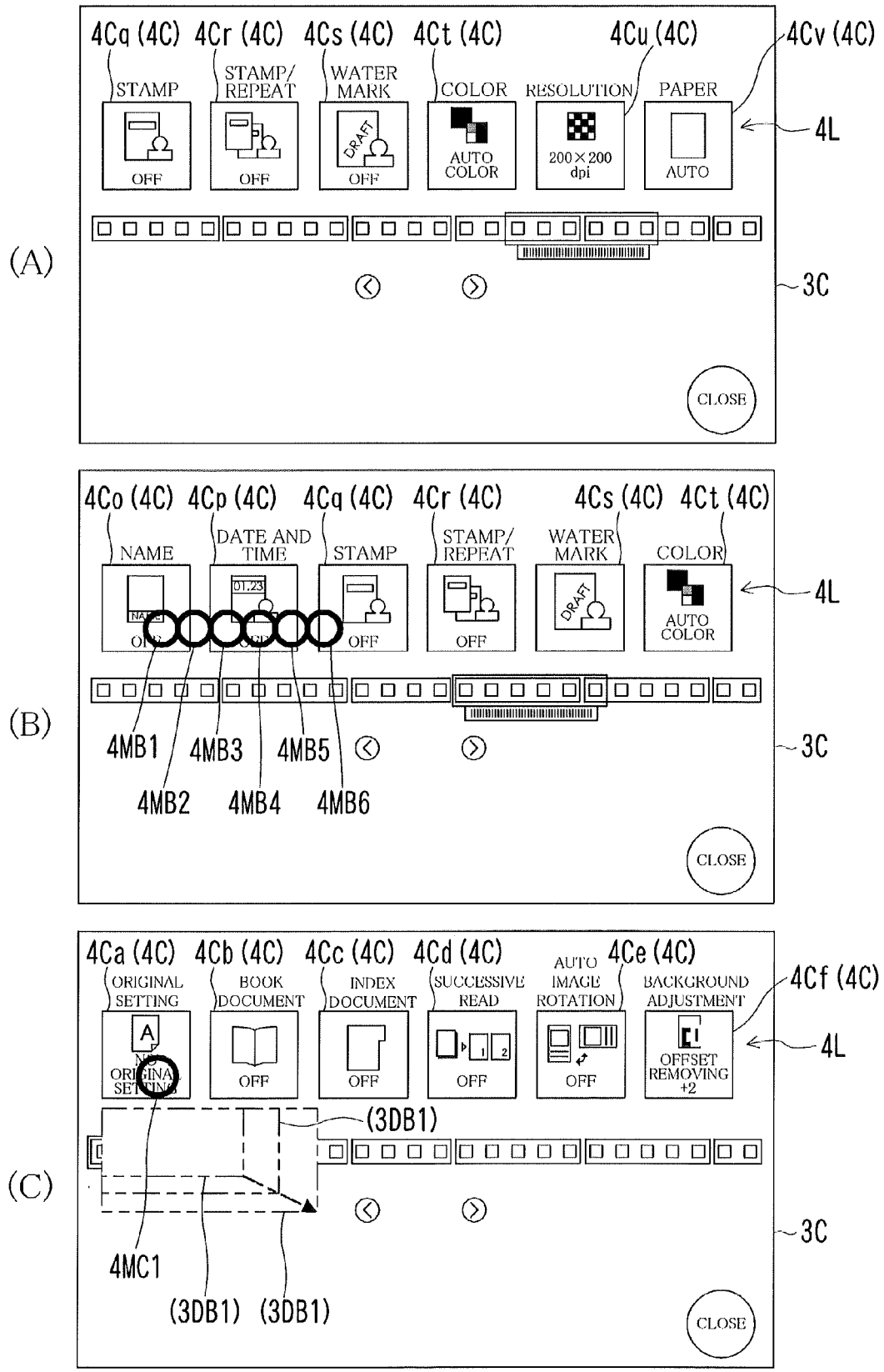
FIG. 32 is a diagram showing an example of screen transition for the case where operation is reproduced.

After completely displaying the copy job screen 3C as shown in (A) of FIG. 32, the image forming apparatus 1 scrolls across the icon row 4L as shown in (B) of FIG. 32. At this time, the image forming apparatus 1 reduces the scroll speed as compared with the case of the normal mode. In addition, the image forming apparatus 1 delays the time to start the scrolling as compared with the time indicated in the operation log data 5F. Further, the image forming apparatus 1 displays marks 4MB1-4MB6 each of which represents "flick" at the touched positions QT touched by the user.

After scrolling across the icon row 4L is finished, the image forming apparatus 1 displays a mark 4MC1 representing "tap" on the optional function icon 4Ca as shown in (C) of FIG. 32. The image forming apparatus 1 also uses the fade-in effect (see FIG. 19) to start displaying the dialog box 3DB1 on the copy job screen 3C. The time to start displaying the dialog box 3DB1 is delayed as compared with the time indicated in the operation log data 5F.

Figure 33:
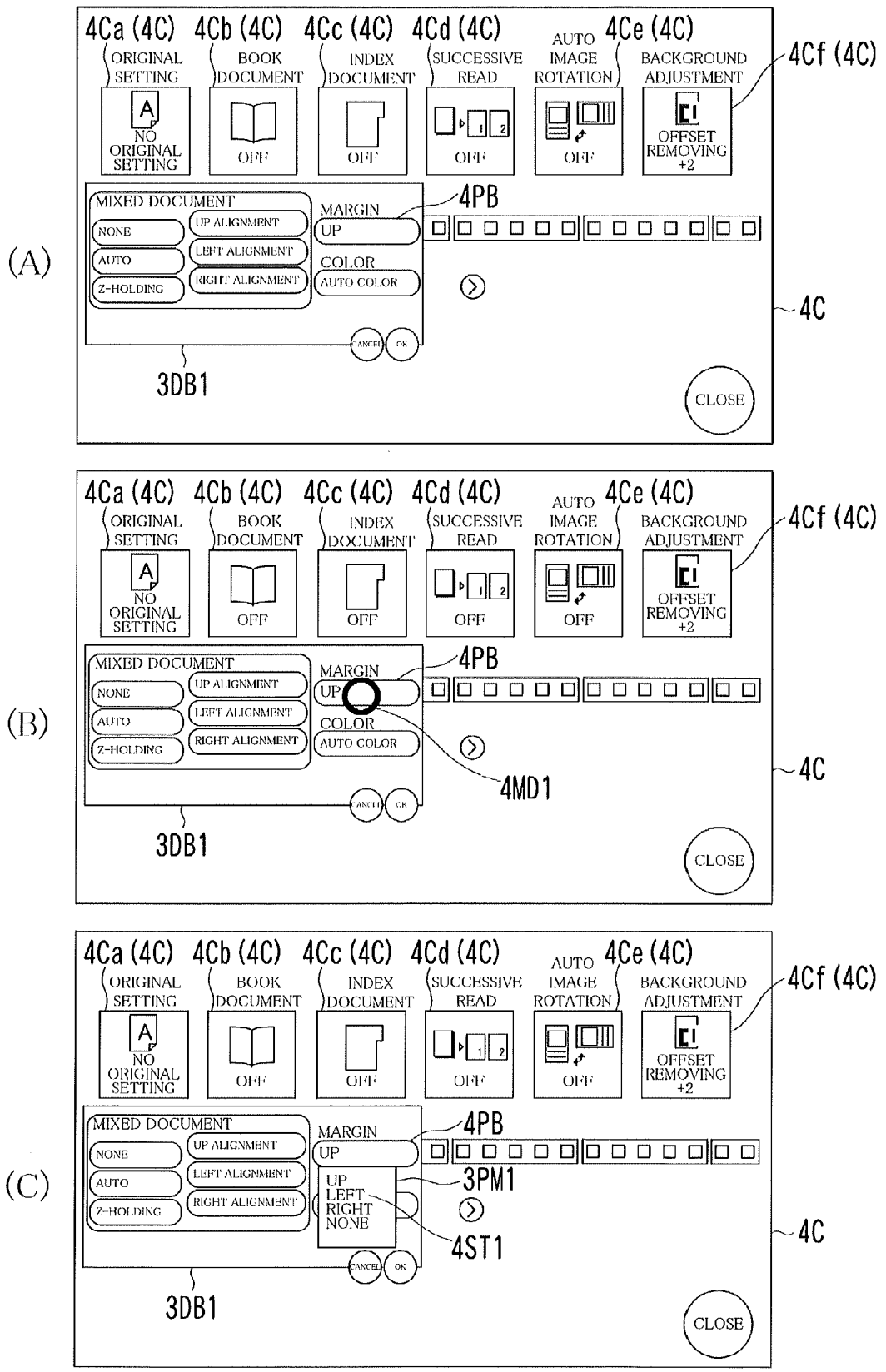
FIG. 33 is a diagram showing an example of screen transition for the case where operation is reproduced.

After completely displaying the dialog box 3DB1 as shown in (A) of FIG. 33, the image forming apparatus 1 displays a mark 4MD1 representing "tap" on the pull-down button 4PB as shown in (B) of FIG. 33. The image forming apparatus 1 then displays the pull-down menu 3PM1 above the dialog box 3DB1 as shown in (C) of FIG. 33. At this time, the image forming apparatus 1 displays the pull-down menu 3PM1 with the fade-in effect applied. The time to start displaying the pull-down menu 3PM1 is delayed as compared with the time indicated in the operation log data 5F.

Figure 34:
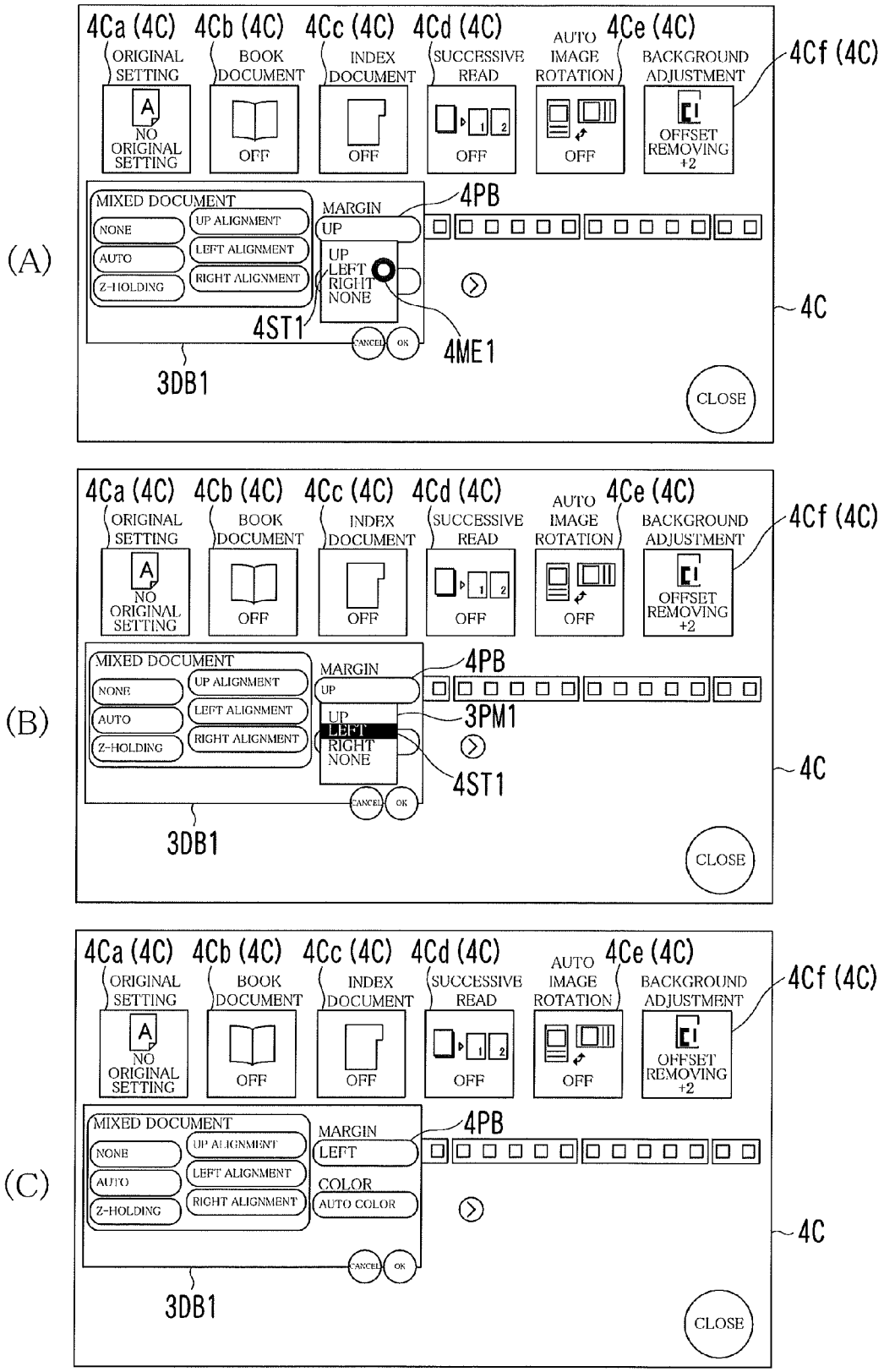
FIG. 34 is a diagram showing an example of screen transition for the case where operation is reproduced.

The image forming apparatus 1 displays a mark 4ME1 corresponding to a tap on the option 4ST1 as shown in (A) of FIG. 34. The image forming apparatus 1B changes the style of the option 4ST1 to a style as shown in (B) of FIG. 34, and then closes the pull-down menu 3PM1 as shown in (C) of FIG. 34. The time to display the mark 4ME1 and the time to change the style of the option 4ST1 are delayed as compared with the time indicated in the operation log data 5F. The fade-in effect may be applied at the time of closing the pull-down menu 3PM1.

Figure 35:
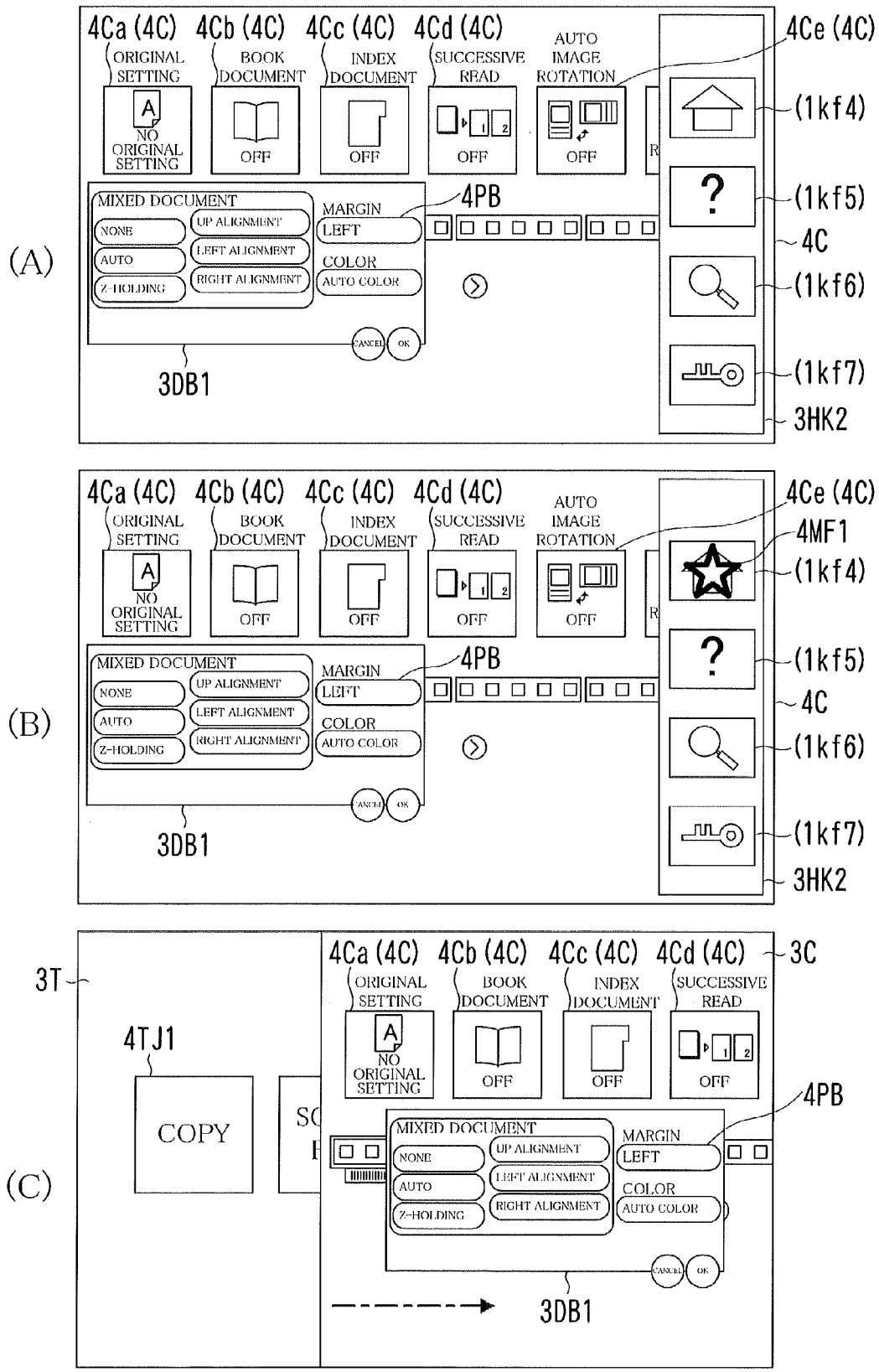
FIG. 35 is a diagram showing an example of screen transition for the case where operation is reproduced.

The image forming apparatus 1 displays the hardware key panel right screen 3HK2 on the copy job screen 3C as shown in (A) of FIG. 35. The image forming apparatus 1 displays a mark 4MF1 representing "pressed" on an image of the function key 1*kf*4 as shown in (B) of FIG. 35. The image forming apparatus 1 closes the hardware key panel right screen 3HK2, closes the copy job screen 3C with the copy job screen 3C slid out as shown in (C) of FIG. 35, and displays the home screen 3T again.

According to this embodiment, the user can check how to perform operation while he/she views a screen reproduced based on the operation log data 5F, more appropriately than is conventionally possible.

The image forming apparatus 1 is used for a consumer to check how to perform operation for job execution. The image forming apparatus 1 is also used for a service engineer or a customer engineer to check how to perform operation for making settings.

In particular, while operation to make settings is often complicated, a person whose operation is recorded as a role model performs operation quickly. Accordingly, when such operation is reproduced as-is like conventional ways, it is sometimes difficult to check how to perform operation for making settings. In light of this, when reproducing operation, the image forming apparatus 1 reduces the speed for screen transition, displays a mark at a touched position, or applies an animation effect forcedly. This makes it possible to check how to perform operation for making settings more appropriately than is conventionally possible.

In this embodiment, the touch panel 10*k*3 is used which detects a direct contact by a finger or stylus. The present invention is not only limited thereto but also applicable to the case where a non-contact type touch panel is used. Instead of the liquid crystal display 10*k*2, another kind of display such as a plasma display may be used.

The following configuration is also possible. The operation log data 5F is copied to another image forming apparatus 1 via a server or a portable recording medium. The other image forming apparatus 1 reproduces operation based on the copied operation log data 5F. For example, the image forming apparatus 1A installed in a business facility of a manufacturer generates the operation log data 5F. The operation log data 5F is distributed to service engineers in training. Each of the service engineers copies the operation log data 5F onto the operation log data storage portion 122 (see FIG. 8) of an image forming apparatus 1B. The service engineer enters a reproduction command to cause the image forming apparatus 1B to reproduce operation. The service engineer then checks how to perform operation by viewing a screen displayed for operation reproduction.

In this embodiment, for the case of operation reproduction, screen transition is delayed by appropriately changing a time given based on the operation log data 5F. Instead of this, however, after the operation log data 5F is generated, the operation log data 5F may be altered to delay the time for screen transition. Then, the operation reproduction may be performed based on the altered operation log data 5F.

It is to be understood that the configurations of the image forming apparatus 1, the constituent elements thereof, the content and order of the processing, the configuration of data, the configuration of the screens, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus provided with a display and a touch panel mounted on a display surface of the display, the image forming apparatus having a normal mode of performing processing in response to an operation made on the touch panel and a reproduction mode of performing processing based on a record of the operation made on the touch panel, the image forming apparatus comprising:
   a storage portion configured to store, thereinto, data showing the operation made on the touch panel in the normal mode;
   a determination portion configured to determine, in the normal mode, display control processing of displaying at least one operating screen on the display based on the operation made on the touch panel, and to determine, in the reproduction mode, the display control processing based on the data stored in the storage portion;
   a control portion configured to perform the determined display control processing, wherein
   when the image forming apparatus is in the normal mode, the control portion performs the determined display control processing within a first timing,
   when the image forming apparatus is in the reproduction mode and when the determined display control processing corresponds to predetermined processing, the control portion performs the determined display control processing within a second timing which is longer in duration than the first timing, and
   when the image forming apparatus is in the reproduction mode and when the determined display control processing does not correspond to the predetermined processing, the control portion performs the determined display control processing within the first timing.

2. The image forming apparatus according to claim 1, wherein
   the at least one operating screen comprises a plurality of operating screens,
   the predetermined processing is partial transition processing of causing a part of a current screen to transition in accordance with predetermined operation made on the touch panel, the current screen being one of the operating screens and displayed currently on the display.

3. The image forming apparatus according to claim 2, wherein
   the partial transition processing is processing of displaying, above the current screen, a small screen smaller than the current screen, and
   the control portion displays the small screen later in the reproduction mode than in the normal mode.

4. The image forming apparatus according to claim 2, wherein
   the predetermined operation is a flick,
   the partial transition processing is processing of scrolling the part of the current screen, and
   the control portion scrolls the part of the current screen at a speed smaller in the reproduction mode than in the normal mode.

5. The image forming apparatus according to claim 2, wherein
   the predetermined operation is a drag,
   the partial transition processing is processing of moving an object in the current screen, and
   the control portion moves the object at a speed smaller in the reproduction mode than in the normal mode.

6. The image forming apparatus according to claim 2, wherein
   the partial transition processing is processing of modifying a style of an object in the current screen, and
   the control portion modifies the style of the object later in the reproduction mode than in the normal mode.

7. The image forming apparatus according to claim 2, wherein
   the predetermined operation is a double-tap consisting of a first tap and a second tap which are made successively within a predetermined time, and
   in the reproduction mode, the control portion performs the partial transition processing at a timing for a case where the second tap is made at a time longer than the predetermined time since the first tap was made.

8. The image forming apparatus according to claim 2, wherein, in the reproduction mode, the control portion performs, along with the display control processing, mark display processing of displaying a mark at a second position in the current screen corresponding to a first position touched on the touch panel.

9. The image forming apparatus according to claim 1, wherein
   the predetermined processing is a screen switching processing of displaying, instead of a current screen currently displayed on the display, another screen, and
   in the reproduction mode, the control portion displays said another screen later in the reproduction mode than in the normal mode.

10. The image forming apparatus according to claim 1, wherein
    the determination portion determines the display control processing based on second data showing operation made on one or more keys, and
    in the reproduction mode, when the display control processing is determined based on the second data, the control portion performs, along with the display control processing, key display control processing of displaying a key image representing said one or more keys and a mark at a position corresponding to a pressed key of said one or more keys.

11. An image forming apparatus provided with a display and a touch panel mounted on a display surface of the display, the image forming apparatus having a normal mode of performing processing in response to an operation made on the touch panel and a reproduction mode of performing processing based on a record of the operation made on the touch panel, the image forming apparatus comprising:
    a storage portion configured to store, thereinto, data showing the operation made on the touch panel in the normal mode;
    a determination portion configured to determine, in the normal mode, display control processing of displaying an operating screen on the display based on the operation made on the touch panel, and to determine, in the reproduction mode, the display control processing based on the data stored in the storage portion; and
    a control portion configured to perform the determined display control processing, wherein when an animation effect is selected and the image forming apparatus is in the normal mode, the control portion performs the determined display control processing using the animation effect, when the animation effect is selected and the image forming apparatus is in the reproduction mode, the control portion performs the determined display control processing using the animation effect, when the animation effect is OFF and the image forming apparatus is in the normal mode, the control portion performs the determined display control processing without using the animation effect, and when the animation effect is OFF and the image forming apparatus is in the reproduction mode, the control portion performs the determined display control processing by using the animation effect.

12. A method for displaying an operating screen by using an image forming apparatus that is provided with a display and a touch panel mounted on a display surface of the display and has a normal mode of performing processing in response to an operation made on the touch panel and a reproduction mode of performing processing based on a record of the operation made on the touch panel, and using a storage portion storing therein data showing the operation made on the touch panel in the normal mode, the method comprising:

a first step of determining by the image forming apparatus, in the normal mode, display control processing of displaying the operating screen on the display based on the operation made on the touch panel, and determining, in the reproduction mode, the display control processing based on the data stored in the storage portion; and a second step of performing by the image forming apparatus the determined display control processing within a first timing when the image forming apparatus is in the normal mode, the determined display control processing within a second timing which is longer in duration than the first timing when the image forming apparatus is in the reproduction mode and the determined display control processing corresponds to predetermined processing, and the determined display control processing within the first timing when the image forming apparatus is in the reproduction mode and the determined display control processing does not correspond to the predetermined processing.

13. A non-transitory computer readable storage medium storing thereon a computer program used to cause the image forming apparatus to perform the first step and the second step according to claim 12.

14. A method for displaying an operating screen by using an image forming apparatus that is provided with a display and a touch panel mounted on a display surface of the display and has a normal mode of performing processing in response to an operation made on the touch panel and a reproduction mode of performing processing based on a record of the operation made on the touch panel, and using a storage portion storing therein data showing the operation made on the touch panel in the normal mode, the method comprising:

a first step of determining by the image forming apparatus, in the normal mode, display control processing of displaying the operating screen on the display based on the operation made on the touch panel, and determining, in the reproduction mode, the display control processing based on the data stored in the storage portion; and a second step of, the image forming apparatus performing the determined display control processing, wherein when an animation effect is selected and the image forming apparatus is in the normal mode, the determined display control processing is performed using the animation effect, when the animation effect is selected and the image forming apparatus is in the reproduction mode, the determined display control processing is performed using the animation effect, when the animation effect is OFF and the image forming apparatus is in the normal mode, the determined display control processing is performed without using the animation effect, and when the animation effect is OFF and the image forming apparatus is in the reproduction mode, the determined display control processing is performed using the animation effect.

15. A non-transitory computer readable storage medium storing thereon a computer program used to cause the image forming apparatus to perform the first step and the second step according to claim 14.

\* \* \* \* \*